US006889029B2

(12) United States Patent
Yamanaka et al.

(10) Patent No.: US 6,889,029 B2
(45) Date of Patent: *May 3, 2005

(54) IMAGE FORMING APPARATUS INCLUDING DRIVING MEANS DISPOSED DOWNSTREAM OF NIP

(75) Inventors: Tetsuo Yamanaka, Tokyo (JP); Kazuhiko Kobayashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/729,962

(22) Filed: Dec. 9, 2003

(65) Prior Publication Data

US 2004/0114972 A1 Jun. 17, 2004

Related U.S. Application Data

(63) Continuation of application No. 10/132,201, filed on Apr. 26, 2002, now Pat. No. 6,708,017.

(30) Foreign Application Priority Data

Apr. 26, 2001 (JP) ....................................... 2001-129359

(51) Int. Cl.$^{7}$ ........................ G03G 15/01; G03G 15/00; G03G 15/16; B41J 2/385; G01D 15/06

(52) U.S. Cl. ......................... 399/301; 347/167; 399/66; 399/167; 399/302; 399/303

(58) Field of Search .............................. 399/49, 66, 76, 399/167, 299, 301, 302, 303, 308, 312, 313; 347/116

(56) References Cited

U.S. PATENT DOCUMENTS 5,384,592 A * 1/1995 Wong ......................... 347/116
6,008,826 A * 12/1999 Foote et al. ................ 347/116
6,094,551 A * 7/2000 Nakamura et al. ...... 399/301 X
6,185,396 B1 * 2/2001 Aizawa et al. .......... 399/302 X
6,218,660 B1 4/2001 Hada

FOREIGN PATENT DOCUMENTS

JP 11-327403 11/1999

OTHER PUBLICATIONS

U.S. Appl. No. 10/729,962, filed Dec. 9, 2003, Patent Appl. Publication No. 2004–0114972, Yamanaka et al.

U.S. Appl. No. 10/893,391, filed Jul. 19, 2004, Yokoyama et al.

U.S. Appl. No. 10/729,962, filed Dec. 9, 2003, Yamanaka et al.

U.S. Appl. No. 10/880,510, filed Jul. 1, 2004, Kobayashi.

* cited by examiner

*Primary Examiner*—Sandra L. Brase
(74) *Attorney, Agent, or Firm*—Oblon, Spivak, McClelland, Maier & Neustadt, P.C.

(57) ABSTRACT

An image forming apparatus of the present invention includes an image carrier whose surface is movable in a preselected direction while carrying a toner image thereon. A movable body has a surface movable in the same direction as the image carrier in contact with the image carrier, thereby forming a nip. A drive member exerts a force that pulls a portion of the movable body contacting the image carrier out of the nip. An image transfer unit transfers the toner image from the image carrier to the movable body at the nip. A controller controllably drives the image carrier and movable body such that the movable body starts moving after the image carrier. The apparatus not only reduces the image forming time, but also frees images from disfigurement ascribable to the slack of the movable body.

6 Claims, 24 Drawing Sheets

| FIG. 22 | FIG. 22A |
| --- | --- |
| | FIG. 22B |

FIG. 23

| REFERENCE IMAGE | DRUM CHARGE POTENTIAL (−V) | BIAS (−V) |
|---|---|---|
| (1) | 350 | 100 |
| (2) | 370 | 120 |
| (3) | 390 | 140 |
| (4) | 410 | 160 |
| (5) | 430 | 180 |
| (6) | 450 | 200 |
| (7) | 490 | 240 |
| (8) | 530 | 280 |
| (9) | 570 | 320 |
| (10) | 810 | 560 |

FIG. 24

| DRUM CHARGE POTENTIAL (-V) | BIAS (-V) |
|---|---|
| 350 | 100 |
| 370 | 120 |
| 390 | 140 |
| 410 | 160 |
| 430 | 180 |
| 450 | 200 |
| 470 | 220 |
| 490 | 240 |
| 510 | 260 |
| 530 | 280 |
| 550 | 300 |
| 570 | 320 |
| 590 | 340 |
| 610 | 360 |
| 630 | 380 |
| 650 | 400 |
| 670 | 420 |
| 690 | 440 |
| 710 | 460 |
| 730 | 480 |
| 750 | 500 |
| 770 | 520 |
| 790 | 540 |
| 810 | 560 |
| 830 | 580 |
| 850 | 600 |
| 870 | 620 |
| 890 | 640 |
| 910 | 660 |
| 930 | 680 |

IMAGE FORMING APPARATUS INCLUDING DRIVING MEANS DISPOSED DOWNSTREAM OF NIP

BACKGROUND OF THE INVENTION

1. Field of the Invention

The present invention relates to a facsimile apparatus, printer, copier or similar image forming apparatus and more particularly to an image forming apparatus of the type transferring a toner image from an image carrier to a movable belt side at a nip between the image carrier and the belt.

2. Description of the Background Art

It is a common practice with an image forming apparatus to hold a photoconductive drum or similar image carrier and a movable belt in contact for thereby forming a nip for image transfer therebetween. In this condition, a toner image is transferred from the image carrier to the belt side. The belt is implemented as, e.g., an intermediate image transfer belt or a sheet conveying belt. The intermediate image transfer belt allows a toner image to be transferred from the image carrier thereto at the nip, conveys the toner image to a secondary image transfer position, and then transfers the toner image to a sheet or recording medium. The sheet conveying belt simply conveys a sheet to which a toner image is to be directly transferred from the image carrier. In any case, a toner image is transferred from the image carrier to the belt side at the nip.

The problem with the image forming apparatus of the type described is that a portion of the belt upstream of the nip is apt to slacken due to short tension or a reaction to occur at the beginning of drive. Such a slack of the belt disappears little by little as the time elapses after the start of drive of the belt. However, the speed at which the surface of the belt moves, as measured at the nip, delicately varies before the slack fully disappears. If a toner image is transferred from the image carrier to the belt or a sheet being conveyed thereby when the belt speed is varying, then the toner image is distorted, dislocated or otherwise disfigured. In light of this, it has been customary to start the transfer of the toner image on the elapse of a preselected period of time since the start of drive of the belt. This extra period of time extends the image forming time.

Technologies relating to the present invention are disclosed in, e.g., Japanese Patent Laid-Open Publication Nos. 11-65204, 2000-250281 and 2001-228672.

SUMMARY OF THE INVENTION

It is an object of the present invention to provide an image forming apparatus capable of freeing images from distortion, dislocation and other disfigurement ascribable to the slack of a movable belt, while reducing the image forming time.

An image forming apparatus of the present invention includes an image carrier whose surface is movable in a preselected direction while carrying a toner image thereon. A movable body has a surface movable in the same direction as the image carrier in contact with the image carrier, thereby forming a nip. A drive member exerts a force that pulls a portion of the movable body contacting the image carrier away from the nip. An image transfer unit transfers the toner image from the image carrier to the movable body at the nip. A controller controllably drives the image carrier and movable body such that the movable body starts moving after the image carrier.

In image forming method practicable with the above image forming apparatus is also disclosed.

BRIEF DESCRIPTION OF THE DRAWINGS

The above and other objects, features and advantages of the present invention will become more apparent from the following detailed description taken with the accompanying drawings in which:

FIG. 23 is a table listing image forming conditions under which reference images unique to the illustrative embodiment are formed on photoconductive drums; and FIG. 24 is a table listing image forming conditions stored in a controller included in the illustrative embodiment.

DESCRIPTION OF THE PREFERRED EMBODIMENT

Figure 1:
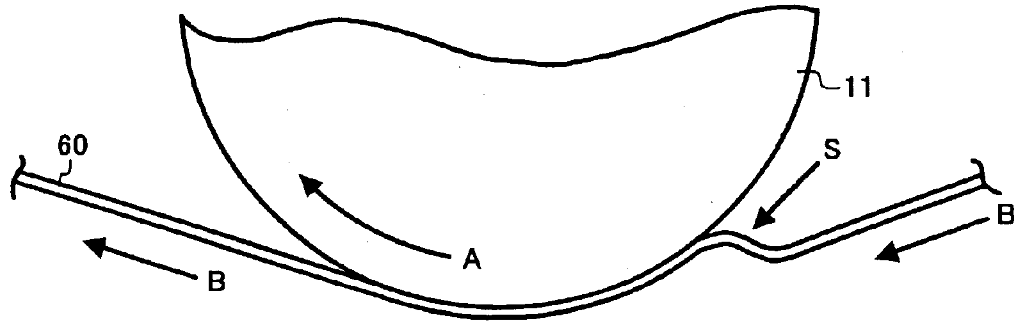
FIG. 1 PRIOR ART
FIG. 1 is a side elevation showing a nip for image transfer formed in a conventional image forming apparatus in a condition just after the start of drive of a movable belt.

To better understand the present invention, brief reference will be made to a conventional image forming apparatus, shown in FIG. 1. As shown, the image forming apparatus includes a photoconductive drum 11 rotatable in a direction indicated by an arrow A. An image transfer/conveyance belt 60 is movable in a direction indicated by an arrow B in contact with the drum 11. Just after the start of drive of the belt 60, the belt 60 slackens at a position S upstream of a nip between the drum 11 and the belt 60 in the direction B.

The slack S of the belt 60 disappears little by little as the time elapses after the start of drive of the belt 60. However, the speed at which the surface of the belt 60 moves, as measured at the nip, delicately varies before the slack S fully disappears, as stated earlier. If a toner image is transferred from the drum 11 to the belt 60 or a sheet being conveyed thereby when the belt speed is varying, then the toner image is distorted, dislocated or otherwise disfigured. In light of this, it has been customary to start the transfer of the toner image on the elapse of a preselected period of time since the start of drive of the belt 60. This, however, brings about the problem discussed earlier.

Figure 2:
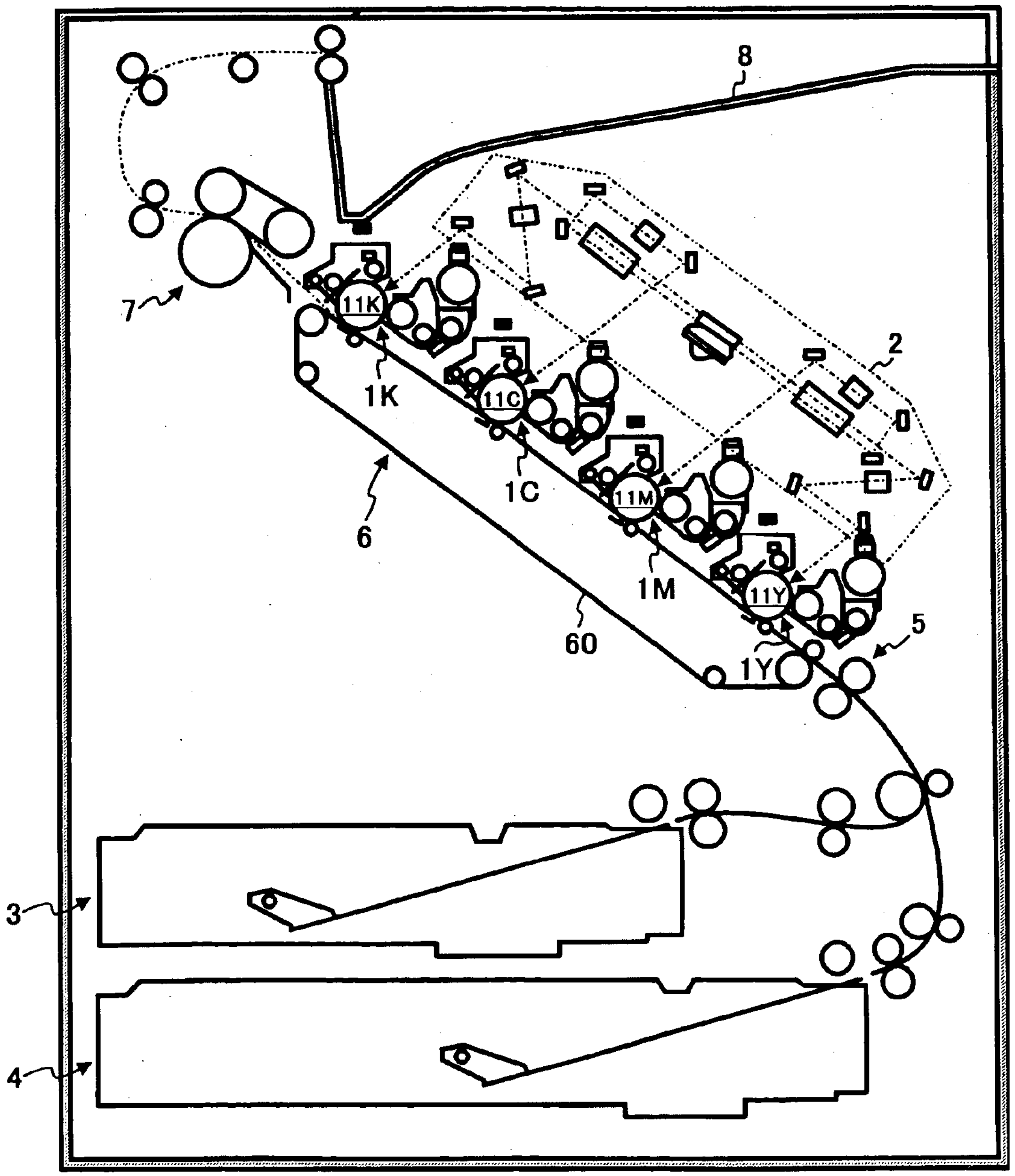
FIG. 2 is a view showing the general construction of an image forming apparatus embodying the present invention.

Referring to FIG. 2, an image forming apparatus embodying the present invention is shown and implemented as a tandem, color laser printer by way of example. As shown, the color laser printer includes four toner image forming sections 1Y (yellow), 1M (magenta), 1C (cyan) and 1K (black) sequentially arranged from the upstream side toward the downstream side in a direction in which a sheet, not shown, moves. The toner image forming sections 1Y, 1M, 1C and 1K, which are generally identical in configuration, include photoconductive drums or image carriers 11Y, 11M, 11C and 11K, respectively.

The printer further includes an optical writing unit 2, sheet cassettes 3 and 4, a registration roller pair 5, an image transfer unit 6, a belt type fixing unit 7, and a print tray 8. The printer additionally includes a manual feed tray, a toner cartridge storing fresh toner, a waster toner bottle, a duplex print unit, and a power supply unit although not shown specifically.

The optical writing unit 2 includes a light source, a polygonal mirror, an f-θ lens, and mirrors. The writing unit 2 scans each of the drums 11Y through 11K with a particular laser beam in accordance with image data.

Figure 3:
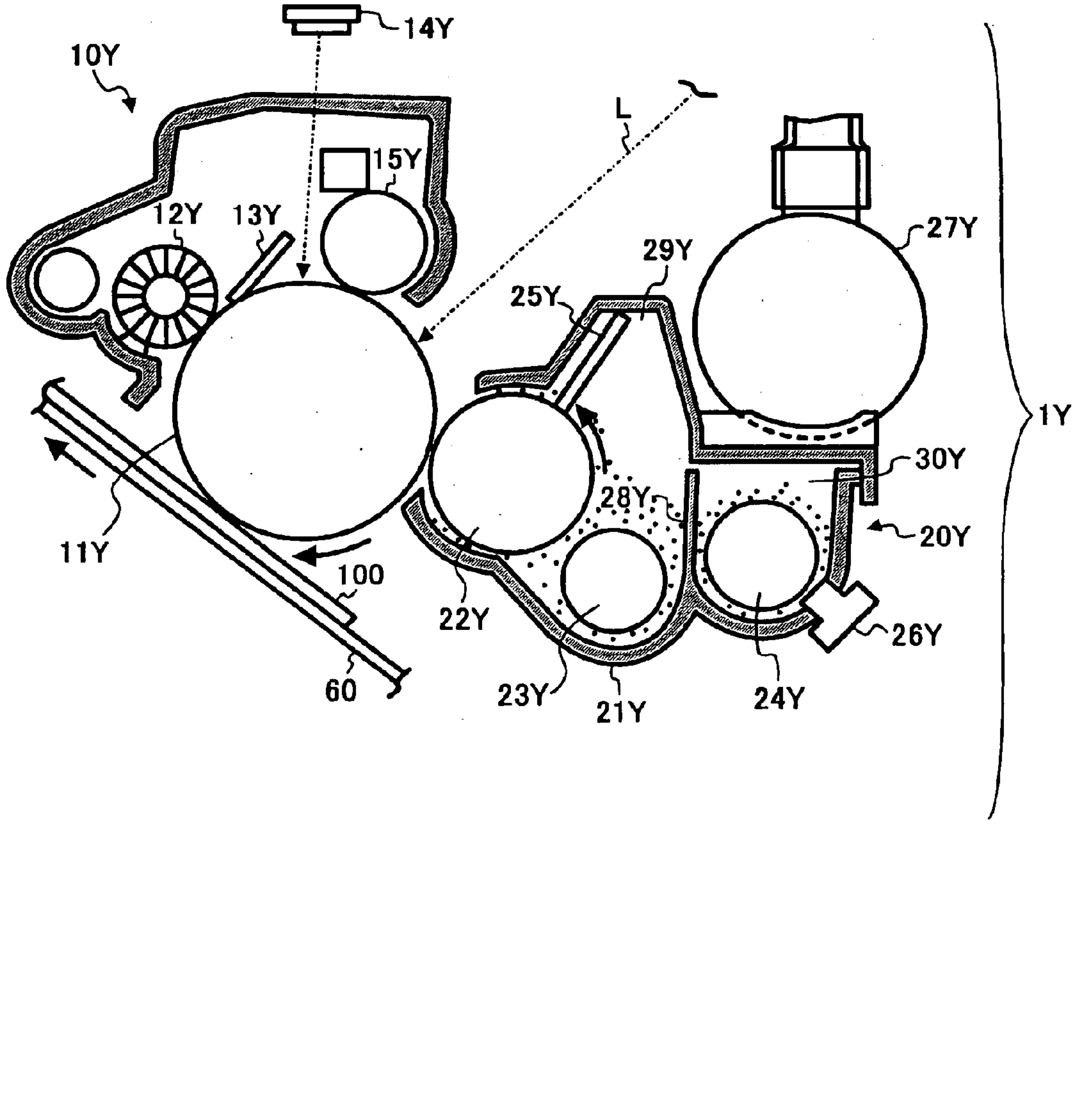
FIG. 3 is a view showing one of toner image forming sections included in the illustrative embodiment.

FIG. 3 shows the Y toner image forming section 1Y in detail by way of example. As shown, the Y toner image forming section 1Y includes a photoconductive drum unit (simply drum unit hereinafter) 10Y and a developing unit 20Y. The drum unit 10Y includes, in addition to the drum 11Y, a brush roller 12Y, a movable counter blade 13Y, a quenching lamp 14Y, and a non-contact charge roller 15Y. The brush roller 12Y coats a lubricant on the surface of the drum 11Y while the counter blade 13Y cleans the surface of the drum 11Y. The quenching lamp 14Y discharges the surface of the drum 11Y while the charge roller 15Y uniformly charges the surface of the drum 11Y. The surface of the drum 11Y is implemented by an OPC (Organic PhotoConductor) layer.

The charge roller 15Y to which an AC voltage is applied uniformly charges the surface of the drum 11Y. The optical writing unit 2 scans the charged surface of the drum 11Y with a laser beam modulated and deflected in accordance with image data, thereby forming a latent image on the drum surface.

The developing unit 20Y includes a developing roller or developer carrier 22Y, a first screw conveyor 23Y, a second screw conveyor 24Y, a doctor 25Y, a toner content sensor (T sensor hereinafter) 26Y, and a powder pump 27Y. The developing roller 22Y is partly exposed to the outside through an opening formed in a case 21Y. The case 21Y stores a developer consisting of magnetic carrier grains and Y toner grains chargeable to negative polarity.

The first and second screw conveyors 23Y and 24Y convey the developer while agitating the developer and thereby charging it by friction. The developer is then deposited on the surface of the developing roller 22Y. The developing roller 22Y conveys the developer to a developing position where the roller 22Y faces the drum 11Y. At this instant, the doctor 25Y regulates the thickness of the developer forming a layer on the developing roller 22Y. At the developing position, the Y toner contained in the developer is transferred from the developing roller 22Y to the drum 11Y, developing the latent image to thereby form a Y toner image. The developing roller 22Y then returns the developer lost the Y toner to the case 21.

A partition 28Y intervenes between the first and second screw conveyors 23Y and 24Y and forms a first chamber 29Y and a second chamber 30Y in the case 21. The first chamber 29Y accommodates the developing roller 22Y, first screw conveyor 23Y and so forth while the second chamber 30Y accommodates the second screw conveyor 24Y.

The Y toner image is transferred from the drum 11Y to a sheet conveyed to the drum 11Y by an image transfer/conveyance belt 60, which will be described specifically later.

Drive means, not shown, causes the first screw conveyor 23Y to rotate. In the first chamber 29Y, the screw conveyor 23Y conveys the developer along the surface of the developing roller 22Y from the front to the rear in the direction perpendicular to the sheet surface of FIG. 3.

Figure 4:
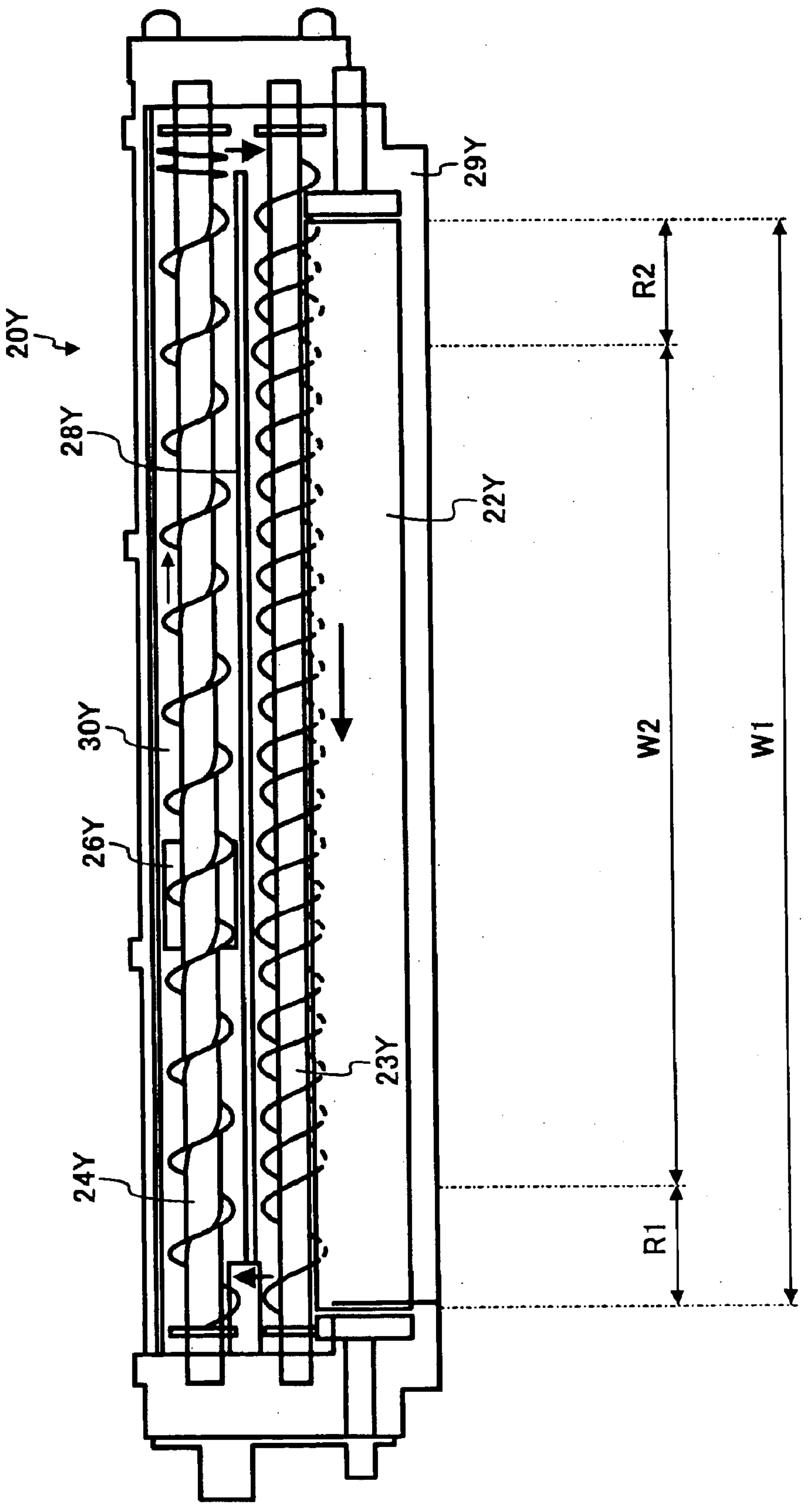
FIG. 4 is a vertical section showing a developing unit included in the toner image forming section.

FIG. 4 shows the developing device 20Y in a vertical section. As shown, the partition 28Y is formed with two holes providing communication between the two chambers 29Y and 30Y at opposite end portions of the screw conveyors 23Y and 24Y. In this configuration, the developer conveyed by the screw conveyor 23Y to one end portion of the chamber 29Y is transferred from the chamber 29Y to the other chamber 30Y via one of the two holes formed in the partition 28Y.

In the chamber 30Y, drive means, not shown, causes the other screw conveyor 24Y to rotate. The screw conveyor 24Y conveys the developer entered the chamber 30Y in the opposite direction to the screw conveyor 23Y. The developer conveyed by the screw conveyor 24Y to one end portion of the chamber 30Y is returned to the chamber 29Y via the other hole formed in the partition 28Y.

The T sensor 26Y is implemented as a permeability sensor and mounted on the bottom center of the chamber 30Y. The T sensor 26Y outputs a voltage corresponding to the permeability of the developer moving over the sensor 26Y. The permeability of the developer has some degree of correlation with the toner content of the developer, so that the output voltage of the T sensor 26Y corresponds to the Y toner content of the developer. The output voltage of the T sensor 26Y is sent to a controller not shown.

The controller mentioned above includes a RAM (Random Access Memory). The RAM stores a Y target value Vtref of the output voltage of the T sensor 26Y assigned to the Y toner. Also, the RAM stores M, C and K target values Vtref of the output voltages of T sensors 26M, 26C and 26K assigned to M toner, C toner and K toner, respectively. As for the developing unit 20Y, the controller compares the output voltage of the T sensor 26Y with the Y target value Vtref. The controller then drives the powder pump 27Y connected to a Y toner cartridge, not shown, for a period of time matching with the result of comparison. The powder pump 27Y delivers fresh Y toner from the Y toner cartridge to the chamber 30Y. Such toner replenishment control replenishes an adequate amount of fresh Y toner to the developer existing in the chamber 30Y and having its Y toner content lowered due to consumption. Consequently, the developer is transferred from the chamber 30Y to the chamber 29Y with a Y toner content lying in a preselected range. This is also true with the other developing units 20M, 20C and 20K.

Figure 5:
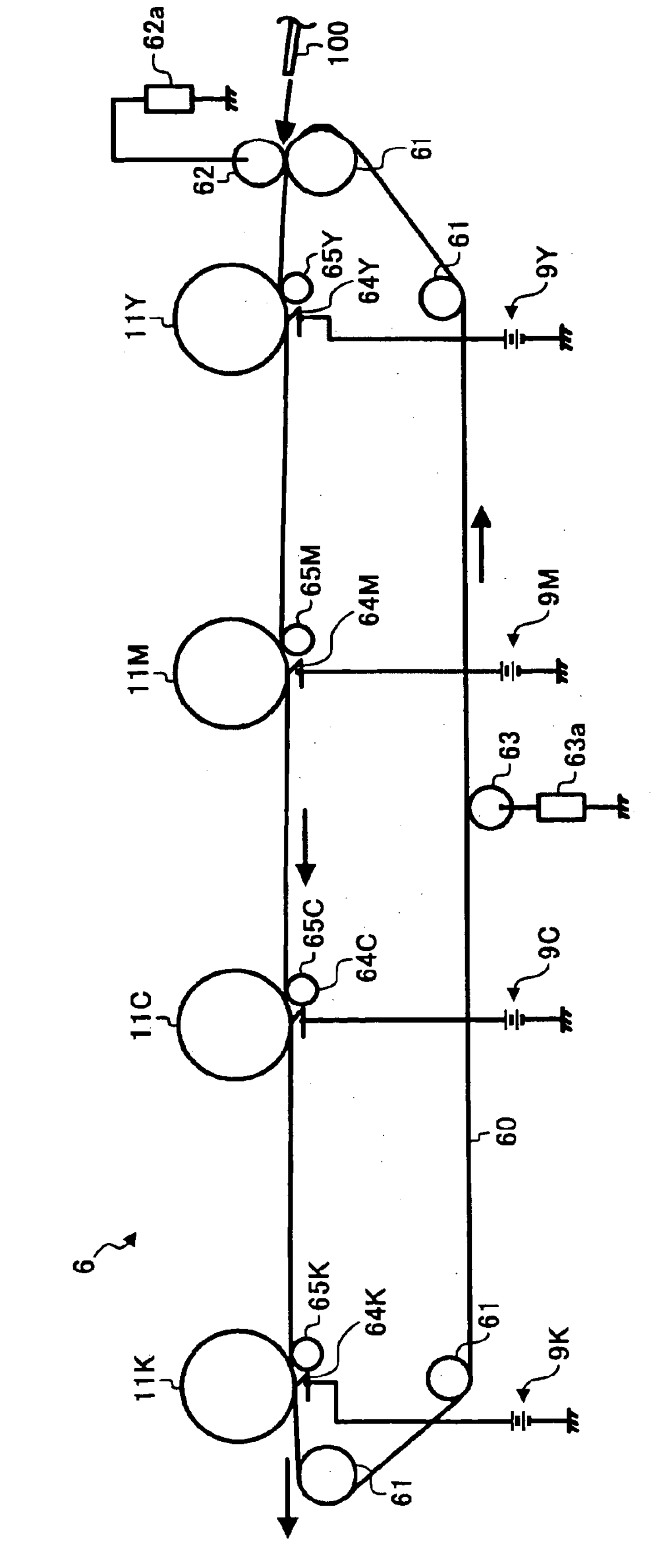
FIG. 5 is a view showing an image transfer unit also included in the illustrative embodiment.

The image transfer unit 6 includes the previously mentioned belt 60, which is an endless belt movable in contact with the drums 11Y through 11K. Specifically, as shown in FIG. 5, the belt 60 is passed over four support rollers 61 connected to ground and sequentially passes image transfer positions where the drums 11Y through 11K are positioned. In the illustrative embodiment, the belt 60 has a single layer formed of PVDF. (polyvinylidene fluoride) whose volume resistivity is as high as $10^9$ Ω·cm to $10^{11}$ Ω·cm.

An adhesion roller 62 faces the rightmost one of the support rollers 61, as seen in FIG. 5. A power supply 62*a* applies a preselected voltage to the adhesion roller 62. When the registration roller pair 5 conveys a sheet to the position between the support roller 61 and the adhesion roller 62, the adhesion roller 62 causes the sheet to electrostatically adhere to the belt 60.

Drive means, not shown, causes the leftmost support roller 61, as seen in FIG. 5, to rotate and drive the belt 60 by friction. A bias roller 63 is held in contact with the outer surface of the lower run of the belt 60 between two support rollers 61, which are positioned below the rightmost and leftmost support rollers 61. A power supply 63*a* applies a preselected cleaning bias to the bias roller 63.

Transfer bias applying members 65Y, 65M, 65C and 65M are held in contact with the inner surface of the belt 60 at the consecutive nips for image transfer. The transfer bias applying members 65Y through 65M are implemented as fixed brushes formed of Mylar. Power supplies 9Y, 9M, 9C and 9K apply image transfer biases to the transfer bias applying means 65Y through 65K, respectively. The bias applying means 65Y through 65K therefore each apply a particular transfer charge to the belt 60 at the respective image transfer position. The transfer charge forms an electric field having preselected strength between the belt 60 and the surface of the drum.

Figure 6:
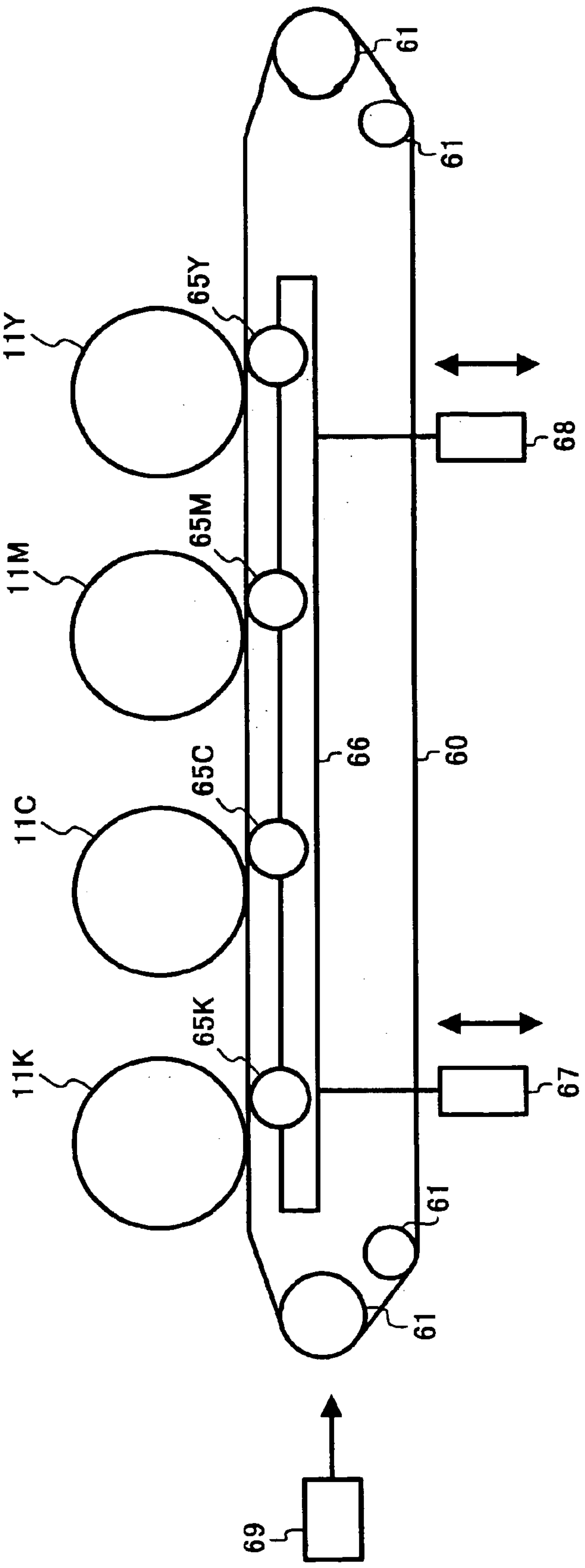
FIG. 6 is a view showing transfer pressure adjusting means included in the image transfer unit.

FIG. 6 shows transfer pressure adjusting means for adjusting the image transfer pressure of the image transfer unit 6. As shown, a single base 66 rotatably supports the transfer bias applying members 65Y through 65K and is supported by two solenoids 67 and 68. The solenoids 67 and 68 move the transfer bias applying members 65Y through 65K upward or downward via the base 66. As a result, a nip pressure or contact pressure between the drums 11Y through 11K and the belt 60 is adjusted. When toner images of different colors are to be transferred to a sheet one above the other the belt 60 is pressed against the drums 11Y through 11K such that a preselected nip pressure is set up.

As shown in FIG. 2, a sheet is paid out from either one of the sheet cassettes 3 and 4 and conveyed along a path indicated by a dash-and-dots line. Specifically, the sheet paid out from the sheet cassette 3 or 4 is conveyed to and temporarily stopped by the registration roller pair 5. The registration roller pair 5 drives the sheet toward the belt 60 at a preselected timing. The belt 60 conveys the sheet via the consecutive nips between the belt 60 and the drums 11Y through 11K.

Toner images formed on the drums 11Y through 11K are sequentially transferred to the sheet one above the other at the consecutive nips for image transfer under the action of the electric fields and nip pressure. As a result, a full-color toner image is completed on the sheet.

As shown in FIG. 3, after the image transfer, the brush roller 12Y coats a preselected amount of lubricant on the surface of the drum 11Y. Subsequently, the counter blade 13Y cleans the surface of the drum 11Y. Thereafter, the quenching lamp 14Y discharges the surface of the drum 11Y with light to thereby prepare the drum 11Y for the next image forming cycle.

As shown in FIG. 2, the fixing unit 7 fixes the full-color toner image carried on the sheet with a heat roller. The sheet coming out of the fixing unit 7 is driven out to the print tray 8. The fixing unit 7 includes a temperature sensor, not shown, responsive to the temperature of the heat roller.

Figure 7:
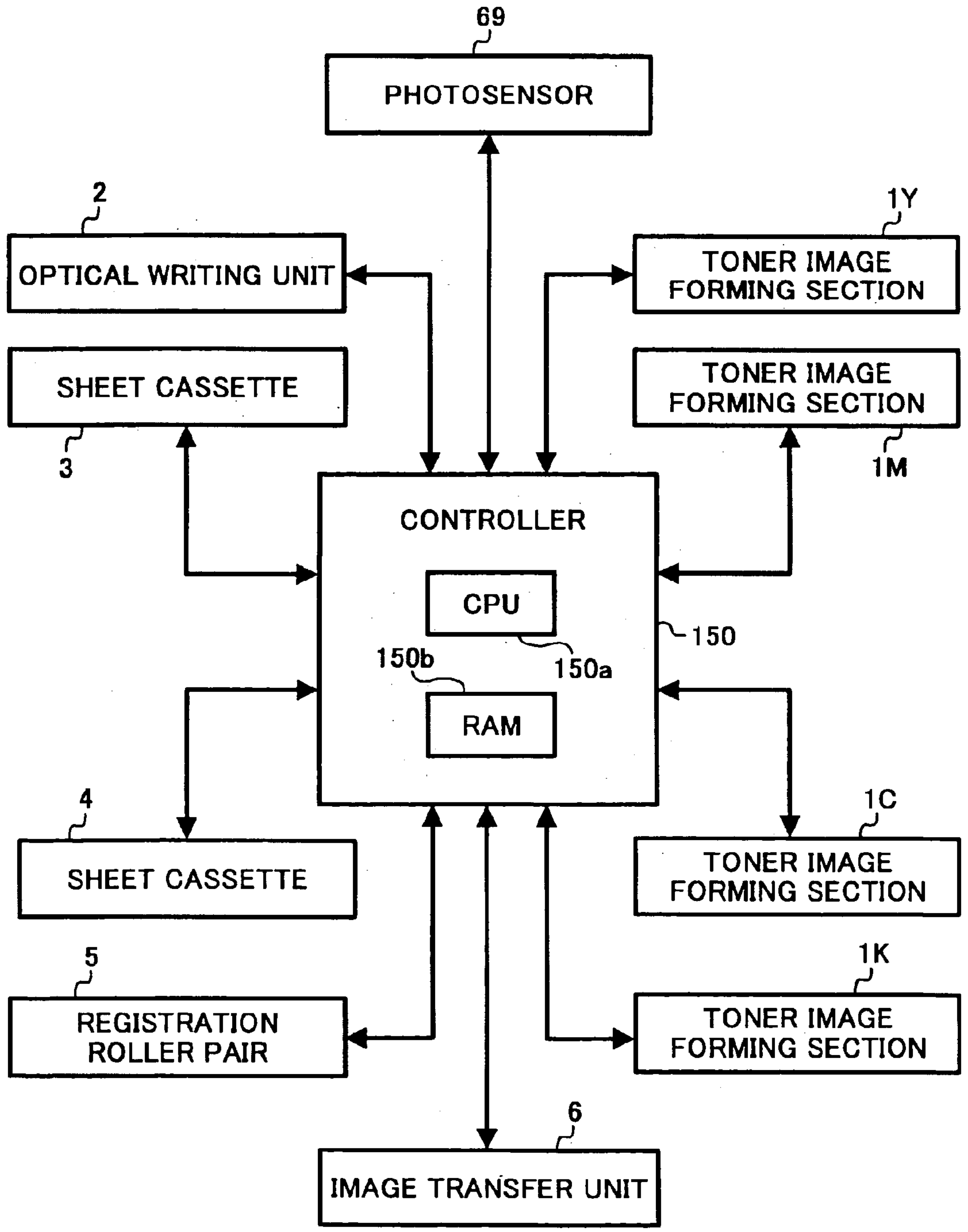
FIG. 7 is a block diagram schematically showing a control system included in the illustrative embodiment.

FIG. 7 shows a control system included in the illustrative embodiment. As shown, the previously mentioned controller, labeled 150, controls the toner image forming sections 1Y through 1K, optical writing unit 2, sheet cassettes 3 and 4, registration roller pair 5 and image transfer unit 6 as well as a reflection type photosensor 69. The controller 150 includes a CPU (Central Processing Unit) 150*a* for performing calculations and a RAM 150*b* for storing data. The RAM 150*b* stores data representative of biases for development to be applied to the toner image forming sections 1Y through 1K and data representative of charge voltages assigned to the drums 11Y through 11K.

Correction of image forming conditions unique to the illustrative embodiment will be described hereinafter. In a printing process, the controller 150 causes biases to be applied to the charge rollers 15Y through 15K such that the drums 11Y through 11K are uniformly charged to a preselected potential. At the same time, the controller 150 causes the biases for development to be applied to the developing rollers 22Y through 22K.

Assume that the temperature of the heat roller is 60° C. or below just after the turn-on of a power switch, not shown, or that more than a preselected number of prints are output. Then, the controller 150 tests the toner image forming sections 1Y through 1K as to image forming ability. First, the controller 150 causes the drums 11Y through 11K to rotate and be charged. The charge assigned to the test differs from the charge assigned to the printing process in that it is sequentially increased toward the negative side. The controller 150 then causes latent images representative of a reference pattern to be formed on the drums 11Y through 11K. At the same time, the controller 150 causes the developing units 20Y through 20K to develop the latent images. As a result, reference patterns Py, Pm, Pc and Pk are formed on the drums 11Y through 11K, respectively.

During development of the above latent images, the controller 150 sequentially increases the biases applied to the developing rollers 22Y through 22K little by little toward the negative side. The controller 150 does not execute the test if the heat roller temperature is above 60° C. just after the turn-on of the power switch. More specifically, the controller 150 does not execute the test if the interval between the turn-off and the subsequent turn-on of the main switch is as short as several minutes to several ten minutes. This prevents the user from wasting time and saves power and toner.

Figure 8:
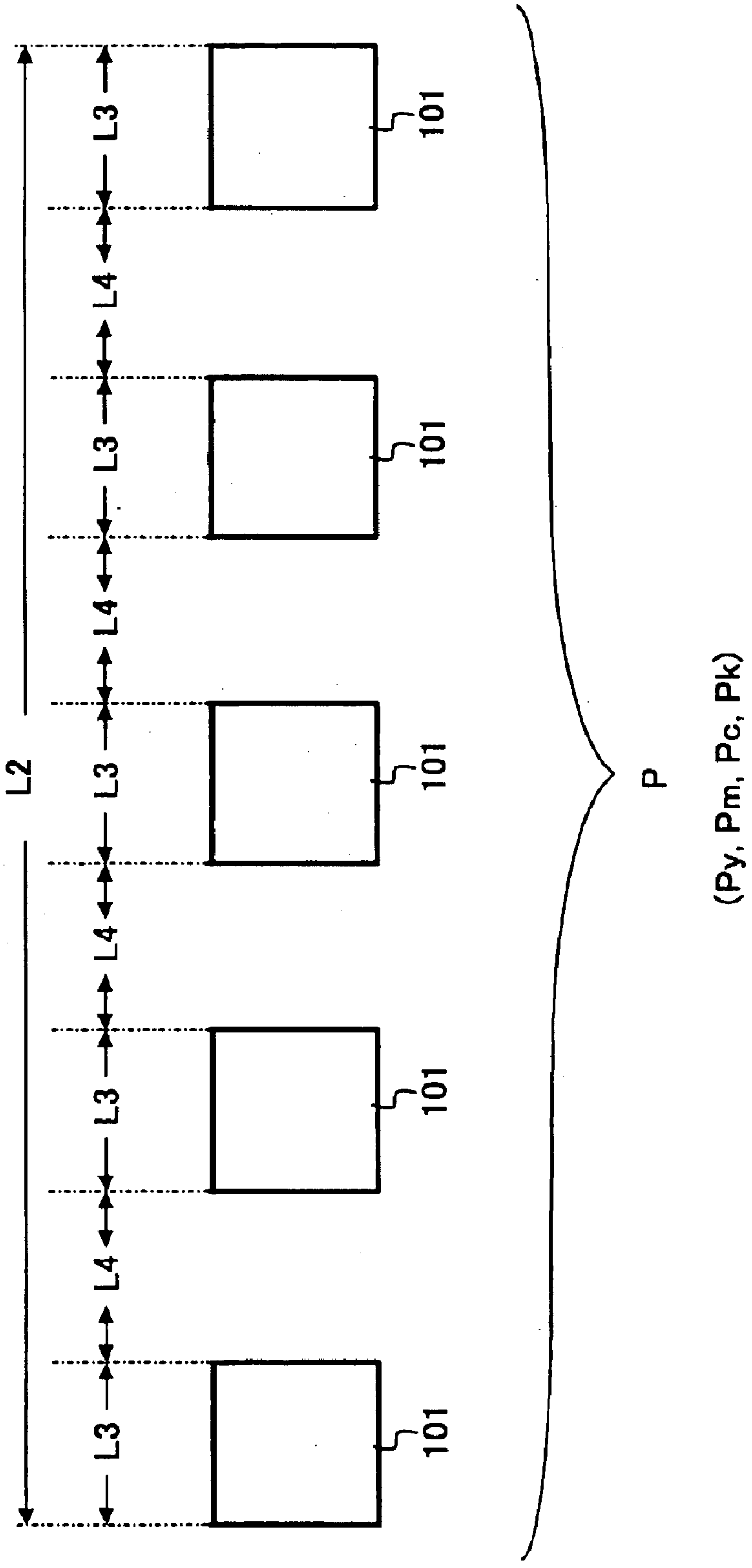
FIG. 8 shows a specific reference pattern for density sensing unique to the illustrative embodiment.

FIG. 8 shows a specific reference pattern P (Py, Pm, Pc or Pk). As shown, the reference pattern is made up of five reference images 101 arranged at an interval of L4. In the illustrative embodiment, the reference images. 101 each are sized 15 mm in the vertical direction and 20 mm in the horizontal direction (L3). The interval or distance L4 is selected to be 10 mm. Therefore, the overall length L2 of the reference pattern P formed on the belt 60 is 140 mm. Toner images representative of the reference patterns Py through Pk are sequentially transferred to the belt 60 side by side without being superposed on each other. The reference patterns Py through Pk sequentially transferred to the belt 60 constitute a single pattern block PB.

Figure 9:
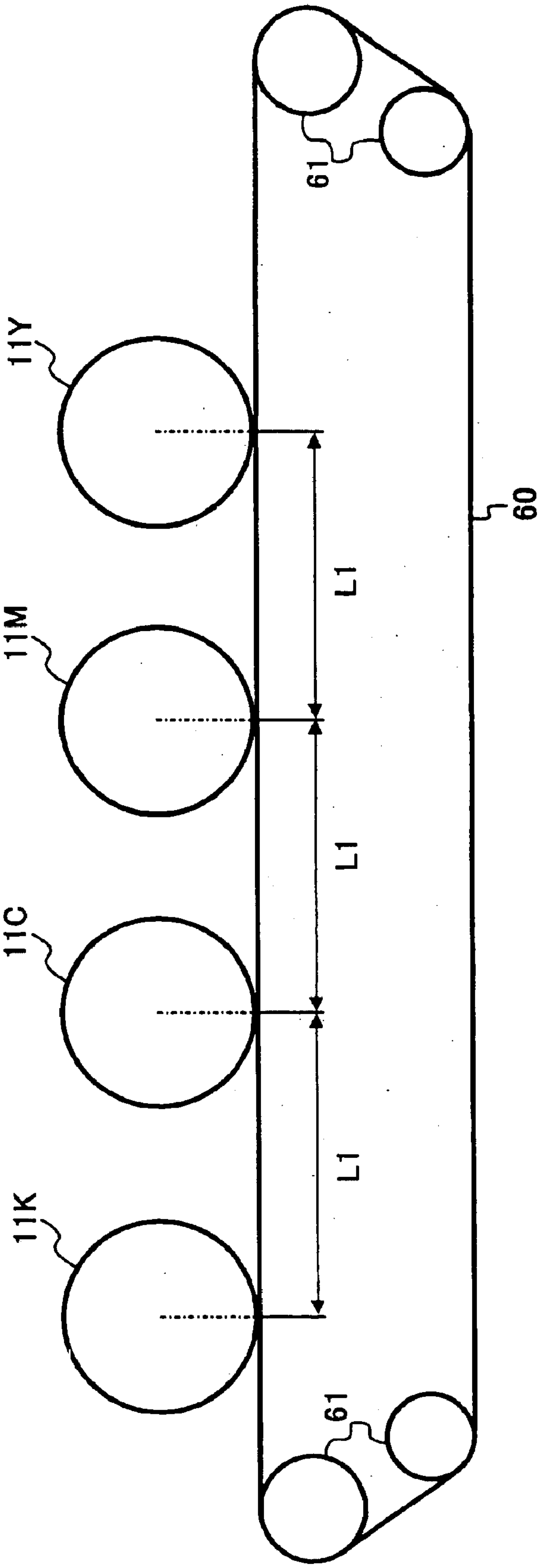
FIG. 9 shows a pitch at which photoconductive drums are arranged in the illustrative embodiment.

FIG. 9 shows a pitch L1 at which the drums 11Y through 11K are arranged. The pitch L1 is selected to be 200 mm. Therefore, the length L2 of each reference pattern Py, Pm, Pc or Pk, which is 140 mm, is smaller than the distance L1 between nearby drums. This allows the reference patterns Py through Pk to be transferred to the belt 60 without overlapping each other.

Figure 10:
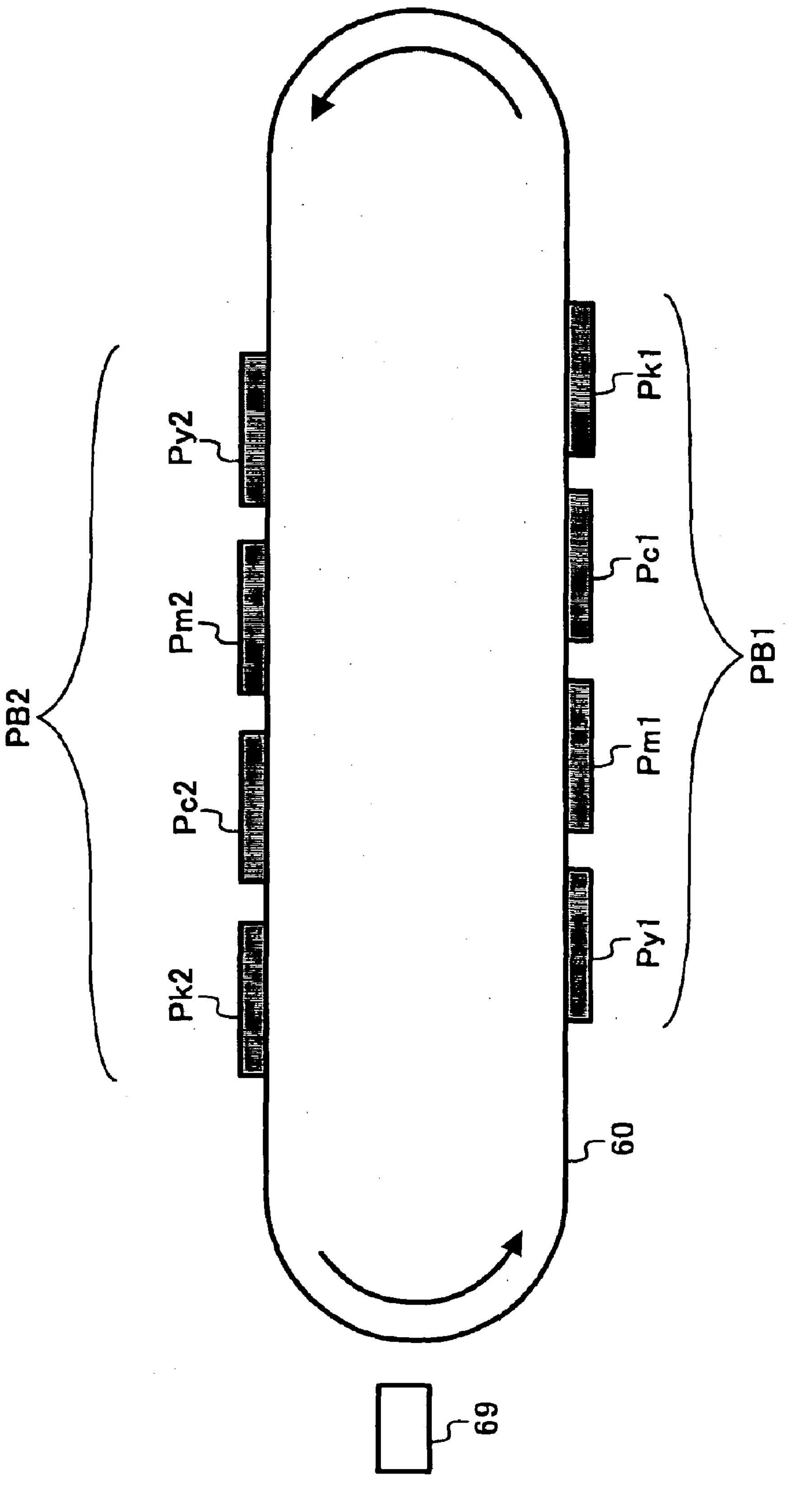
FIG. 10 shows specific pattern blocks formed on a belt included in the illustrative embodiment.

FIG. 10 shows two pattern blocks PB1 and PB2 formed on the belt 60 specifically; the pattern blocks PB1 and PB2 each are the combination of the four reference patterns Pk, Pc, Pm and Py. More specifically, the pattern block PB1 has reference patterns Pk1, Pc1, Pm1 and Py1 while the pattern block PB2 has reference patterns Pk2, Pc2, Pm2 and Py2.

The pattern blocks PB1 and PB2 are formed by the following procedure. After the transfer of the reference patterns Pk1 through Py1 of the first pattern block PB1 to the belt 60, the controller 150 drives the solenoids 67 and 68, FIG. 6, to lower the transfer pressure to a preselected level (including zero pressure) until the most upstream reference pattern Py1 moves away from the most downstream drum 11K. The reference patterns Pc1 through Py1 therefore move together with the belt 60 without being reversely transferred to the downstream drums 11.

Subsequently, at a preselected timing, the controller 150 starts causing the reference patterns Pk2 through Py2 of the second pattern block PB2 to be formed on the drums 11Y through 11K, respectively. The preselected timing mentioned above is such that after the trailing edge of the first pattern block PB1 (reference pattern Py1) has moved away from the nip of the drum 11K and then further moved a preselected distance, the second pattern block PB2 starts being transferred to the belt 60.

After the trailing edge of the first pattern block PB1 (reference pattern Py1) has moved away from the nip of the drum 11K, but before the reference patterns Pk2 through Py2 of the pattern block PB2 start being transferred to the belt 60, the controller 150 drives the solenoid 67 and 68 to raise the transfer pressure to the original value. In this condition, the second pattern block PB2 can be desirably transferred to the belt 60. Again, the controller 150 drives the solenoids 67 and 68 in such a manner as to prevent the pattern block PB2 from being reversely transferred to the downstream drums 11.

The pattern blocks PB1 and PB2 include four reference patterns Py through Pk each while the reference patterns Py through Pk include five reference images each, as stated above. Therefore, ten reference images 101 (5×2=10) are formed in each of the colors Y, M, C and K.

FIG. 23 lists conditions under which the ten reference images 101 are formed. It is to be noted that the laser beam is provided with intensity attenuating the latent images for the reference images 101 to, e.g., −20 V without regard to the charge potential of the drum. In FIG. 23, serial numbers (1) through (10) respectively indicate the first reference image 101 of the first pattern block PB1 through the last reference image of the second pattern block PB2. More specifically, the reference images (1) through (5) belong to the first pattern block PB1 while the reference images (6) through (10) belong to the second pattern block PB2.

As FIG. 23 indicates, the illustrative embodiment forms the reference images (1) through (10) by sequentially lowering both of the drum charge potential and bias for development toward the negative side. Therefore, a potential for development, i.e., a difference between the potential of the latent image and the bias for development and therefore image density sequentially increases from the first one to the last one of the reference images (1) through (10).

Figure 11:
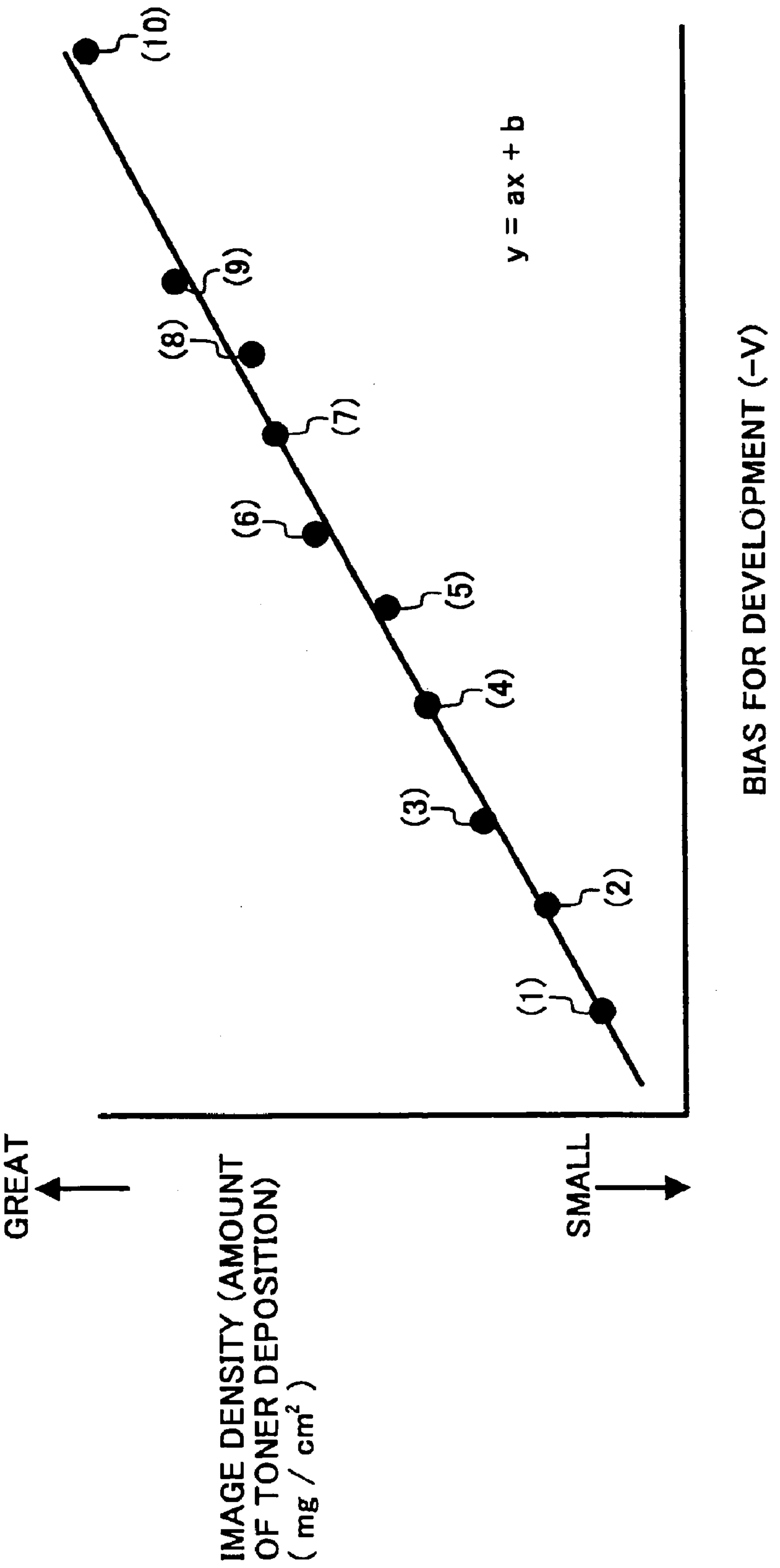
FIG. 11 is a graph showing a relation between a bias for development and the amount of toner deposited on a reference image.

FIG. 11 is a graph showing a specific relation between the biases listed in FIG. 23 and the image densities of the resulting reference images (1) through (10). As shown, the bias for development and image density (amount of toner deposited for a unit area) are correlated to each other. By using a function (x=ax+b) indicative of the linear correlation, it is possible to calculate a bias for development that implements desired image density.

Figure 12:
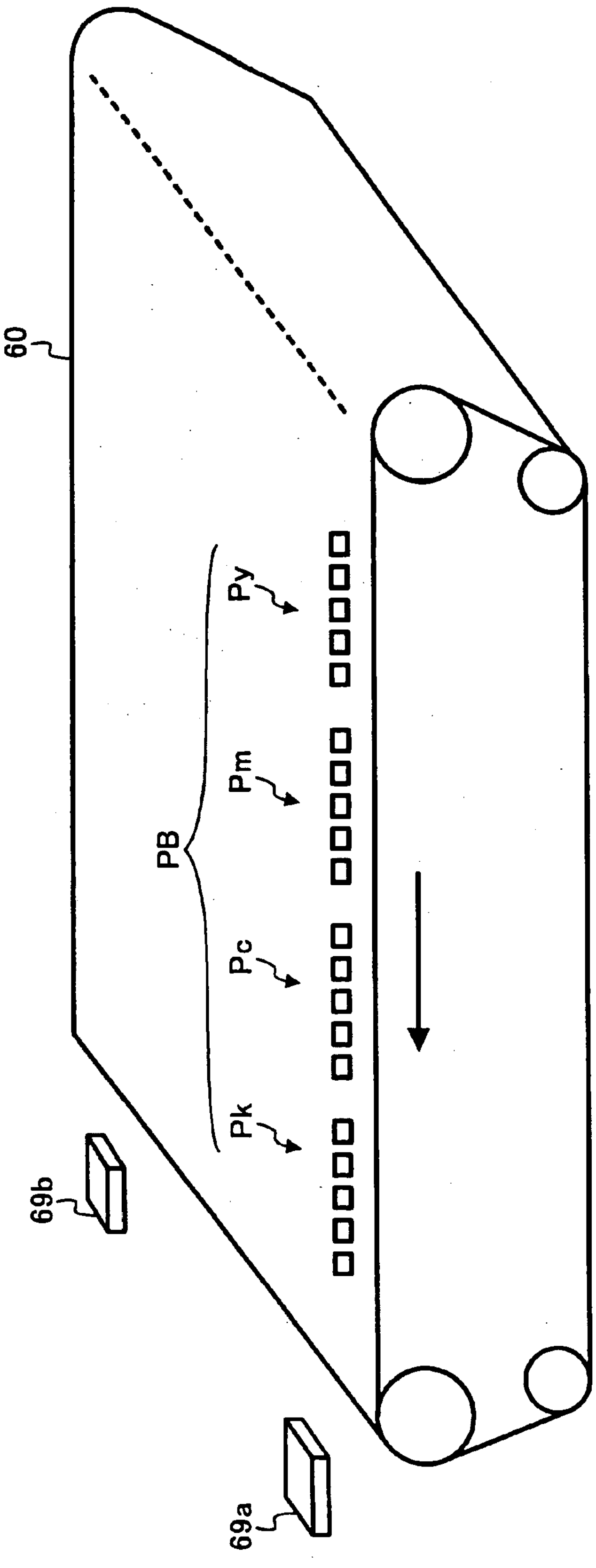
FIG. 12 is an isometric view showing reflection type photosensors together with the belt.

FIG. 12 shows the belt 60 together with the reflection type photosensor or sensing means 69. As shown, in the illustrative embodiment, the photosensor 69 is implemented as two photosensors 69*a* and 69*b*. The pattern blocks PB1 and PB2 are formed on one edge portion of the belt 60 (front edge portion in FIG. 12) and sensed by the photosensor 69*a* one by one. This edge portion of the belt 60 corresponds to a zone R2 (see FIG. 4) included in the developing unit 20Y.

In FIG. 4, a width W2 corresponds to the width of a sheet not shown. The above-mentioned zone R2 is positioned upstream of the width W2 in the direction in which the developer is conveyed in the first chamber 29Y. During usual printing process, part of the developer existing in the zone R2 of the developing roller 22Y does not contribute to development. Therefore, the developer existing on the developing roller 22Y and in the zone R2 of the chamber 29Y has the toner content confined in the preselected range by the replenishment control stated earlier. Consequently, even just after the continuous development of Y toner images with a high image area ratio, e.g., solid images or photo images, the reference patterns Py are developed by the developer with the expected toner density. This is also true with the other reference patterns Pm, Pc and Pk. The function of the other photosensor 69*b* will be described specifically later.

While the belt 60 conveys the reference patterns Pk1 through Py1, FIG. 10, the photosensor 69*a* senses the reference patterns Pk1 through Py1. The reference patterns Pk1 through Py1 are then electrostatically transferred from the belt 60 to the bias roller 63 and removed thereby.

More specifically, the photosensor 69*a* sequentially senses the reference images 101 of each of the reference patterns Pk1 through Py1, which constitute the first pattern block PB1, in the following order. The photosensor 69 first senses five reference images 101 of the reference pattern Pk1, then senses five reference images 101 of the reference pattern Pc1, then senses five reference images 101 of the reference pattern Pm1, and finally senses five reference images 101 of the reference pattern Py1. The photosensor 69 sequentially sends voltage signals representative of quantities of light reflected from the consecutive reference images 101 to the controller 150. The controller 150 sequentially calculates, based on the input voltage signals, the density of the individual reference image 101 while writing it in the RAM 150*a*.

Subsequently, the photosensor 69*a* senses quantities of light reflected from the reference images of the reference patterns Pk2 through Py2, which constitute the second pattern block PB2, while sending voltage signals to the controller 150. Again, the controller 150 calculates the densities of such reference images 101 while writing them in the RAM 150*a*.

The controller 150 performs regression analysis color by color by using the biases for development and the sensed densities of the reference images (1) through (10), thereby producing a function (regression equation) indicative of the graph of FIG. 11. The controller 150 then substitutes target image densities for the above function to thereby produce adequate biases for development while writing the adequate biases in the RAM 150*a*.

FIG. 24 shows another table listing image forming conditions and additionally stored in the RAM 150*a*. As shown, the table lists thirty different biases for development and thirty different drum charge potentials in one-to-one correspondence. The controller 150 scans the table to select, color by color, a bias closest to the corrected bias for development and then selects a drum charge potential related thereto. After writing all of the corrected biases and corrected drum charge potentials in the RAM 150*a*, the controller 150 substitutes values equivalent to the corrected biases for the biases for Y, M, C and K and again writes the above values in the RAM 150*a*. The controller 150 repeats the same correction and storage with the drum charge potentials for Y, M, C and K also. In this manner, the illustrative embodiment corrects image forming conditions assigned to each of the toner image forming sections 1Y through 1K in a particular manner.

In the illustrative embodiment, the T sensor 26 does not directly sense the actual toner content of the developer, but senses permeability relating to the toner content, as stated earlier. Permeability, however, depends not only on the toner content but also on the bulk density of toner. Further, the bulk density is susceptible to temperature, humidity and the degree of agitation of the developer. Therefore, even if fresh toner is replenished such that the output of the T sensor 26 coincides with the target value Vtref, a change in the bulk density of toner is apt to cause the toner content to have a value above or below the target value. A value above the target value and a value below the same respectively increase and reduce the slope of the line shown in FIG. 11, preventing the target value Vtref from matching with the current state of the developer.

When the slope of the line shown in FIG. 11 increases or decreases, as stated above, the controller 150 substitutes the instantaneous output of the T sensor 26 for the target value Vtref of the T sensor 26 included in the developing unit 20 (Y, M, C or K). This successfully matches the target value Vtref to the current state of the developer.

How the illustrative embodiment corrects positional errors will be described hereinafter. The optical writing unit 2, FIG. 2, includes light sources assigned one-to-one to the colors Y, M, C and K and mirrors for reflecting light issuing from the light sources toward the drums 11Y through 11K. The writing unit 2 additionally includes mirror tilting means each for tilting one of the mirrors, which are originally parallel to the drums 11Y through 11K.

Figure 13:
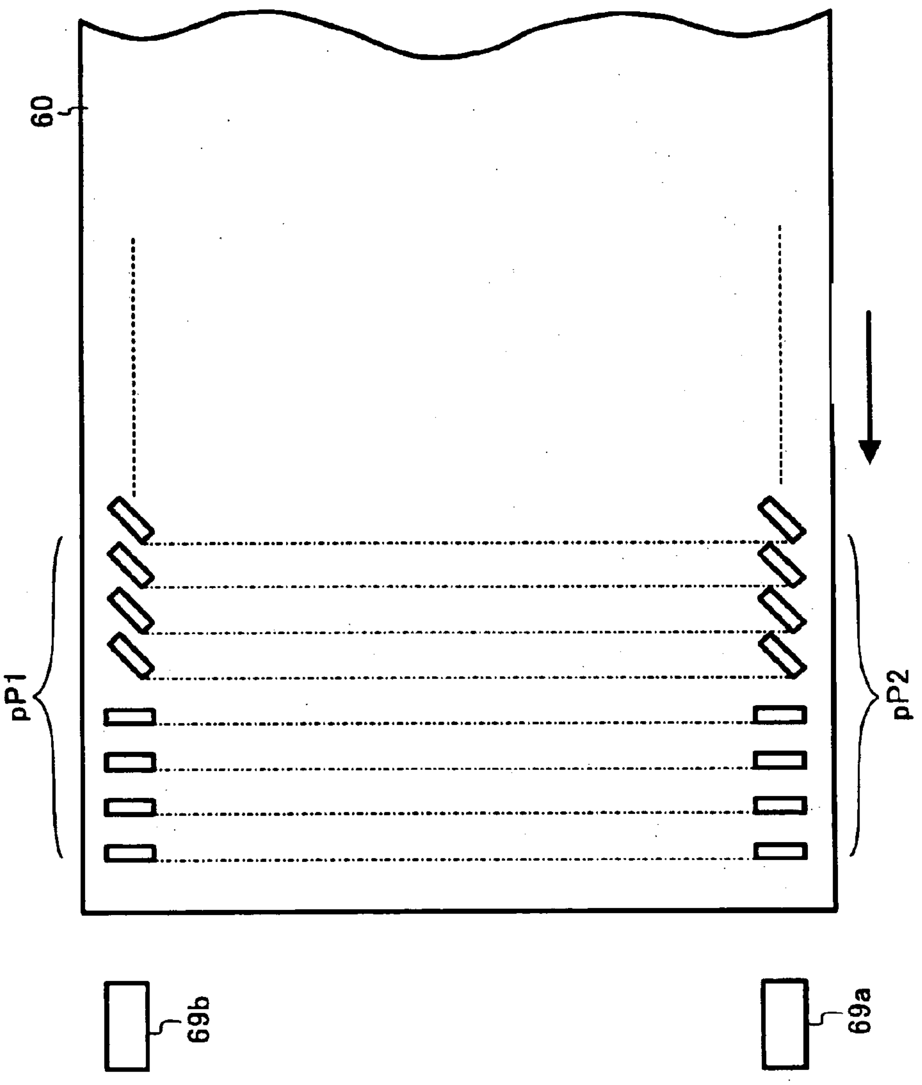
FIG. 13 shows reference patterns for positional error sensing formed on the belt.

After the color-by-color correction of the biases for development and drum charge potentials, the controller 150 starts control for correcting positional errors. FIG. 13 shows specific reference patterns pP1 and pP2 formed on the belt 60 for the correction of positional errors. The reference pattern pP1 is formed on the lower edge portion of the belt 60, as seen in FIG. 13, and sensed by the photosensor 69*a*. The reference pattern pP2 is formed on the upper edge portion of the belt 60, as seen in FIG. 13, and sensed by the photosensor 69*b*.

Figure 14:
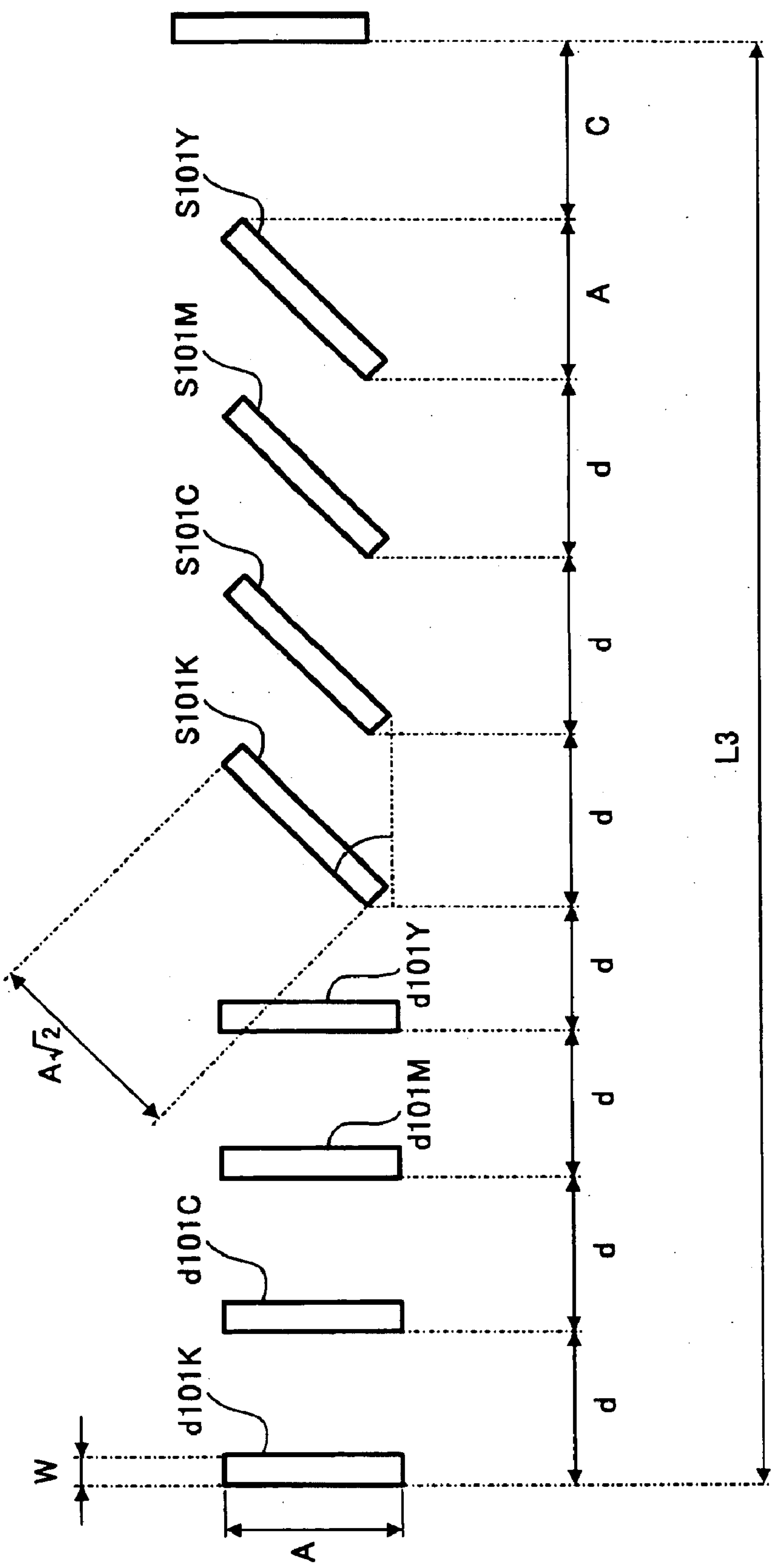
FIG. 14 shows one of the reference patterns of FIG. 13 in an enlarged view.

As shown in FIG. 14, the reference patterns pP1 and pP2 each include four reference images d101K, d101C, d101M and d101Y extending in the widthwise direction of the belt 60 and four reference images s101K, s101C, s101M and s101Y inclined by 45° relative to the widthwise direction. The reference images d101K through d101Y and s101K through s101Y each are spaced by a distance of d. The reference patterns pP1 and pP2 have a length of L3 each. The reference images d101K through d101Y have a length of A and a width of W each while the reference images s101K through s101Y have a length of $A\sqrt{2}$ and a width of W each. The reference images d101K through d101Y and s101K through s101Y of the reference pattern image pP1 and the reference images d101K through d101Y and s101K and s101Y respectively face each other in the widthwise direction of the belt 60.

Figure 15:
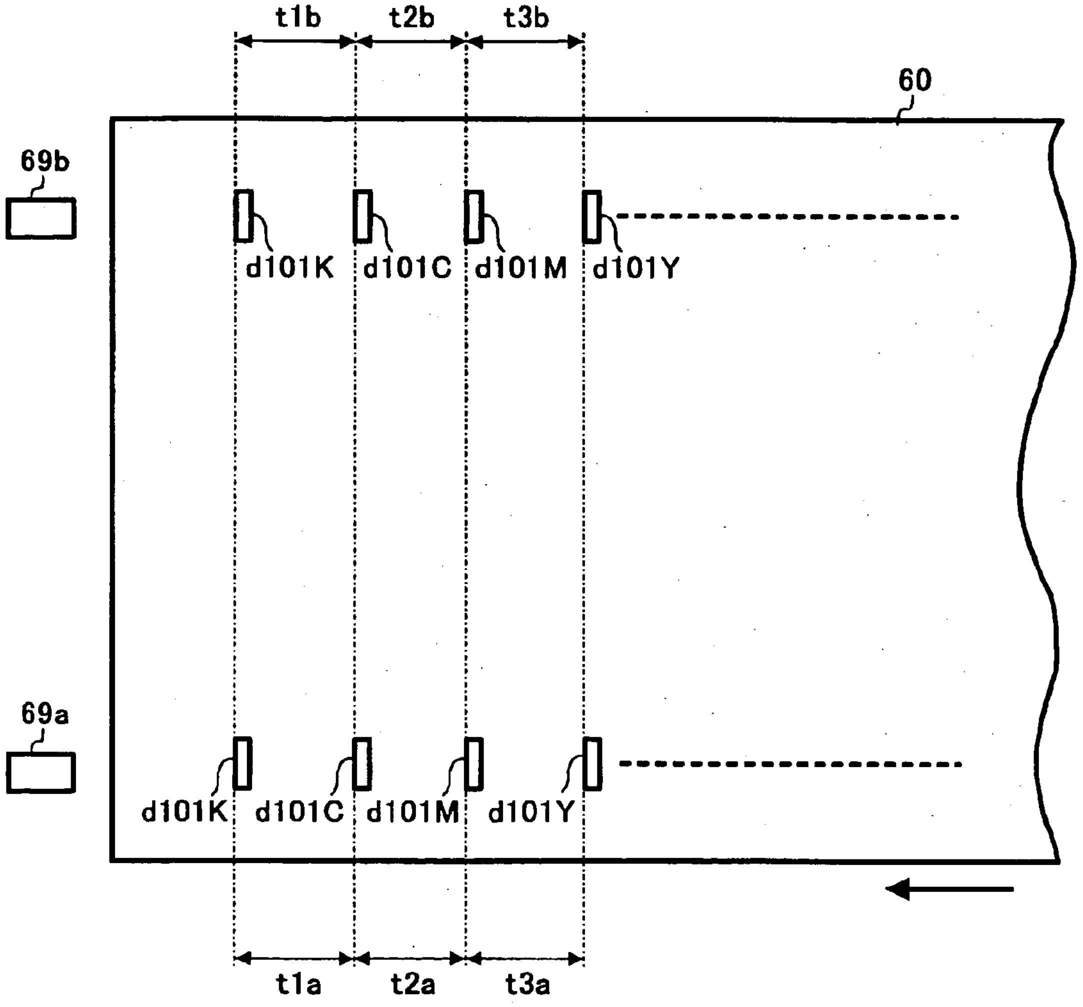
FIG. 15 shows the reference patterns in a condition free from positional errors.

Assume that the drums 11Y through 11K are free from inclination ascribable to assembly errors, that the Y, M, C and K mirrors of the writing unit 2 are free from inclination in the lengthwise direction, and that the Y, M, C and K polygonal mirrors and light sources are driven at preselected timing. Then, as shown in FIG. 13, the reference images are formed on the belt 60 at the same intervals in parallel to each other. In this condition, the photosensors 69*a* and 69*b* sense such reference images 101 substantially at the same time. Also, as shown in FIG. 15, the photosensor 69*a* senses the reference images d101K through d101Y at the same time intervals of t1*a*, t2*a* and t3*a*. Likewise, the photosensor 69*b* senses the reference images d101K through d101Y at substantially the same timing as the photosensor 69*a*, i.e., at identical time intervals of t1*b*, t2*b* and t3*b*.

Figure 16:
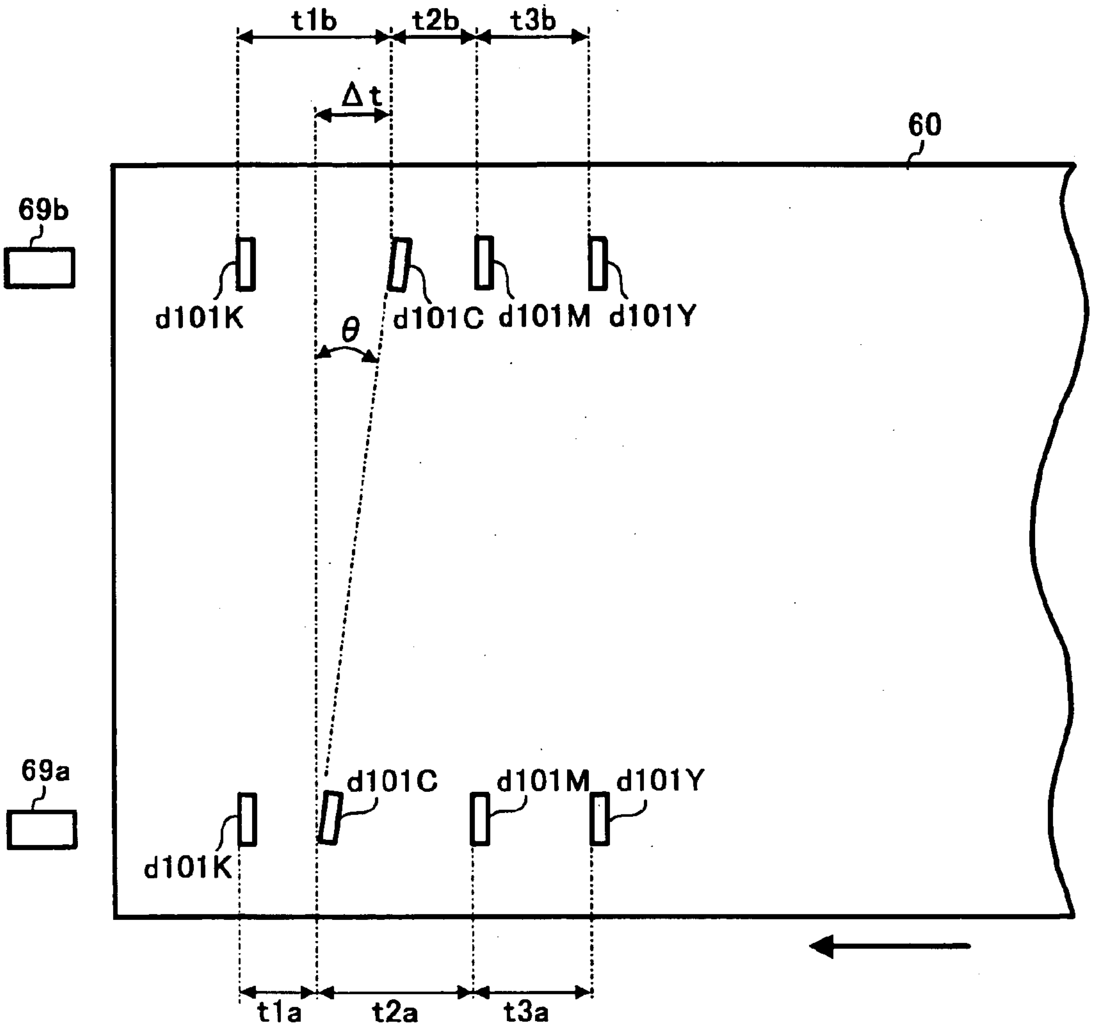
FIG. 16 shows the reference patterns in a condition in which a positional error has occurred due to skew.

However, assume that the drum 11C, for example, is inclined due to an assembly error or that the C mirror included in the writing unit 2 is inclined in the lengthwise direction. Then, as shown in FIG. 16, two reference images d101C expected to face each other are deviated in position from each other due to skew. The deviation brings about a time lag $\Delta t$ between the timing at which the photosensor 69*a* senses the reference image d101C and the timing at which the photosensor 69*b* senses the reference image d101C. A skew angle $\theta$ can be determined on the basis of the time lag $\Delta t$ and the moving speed of the belt 60. This is also true when skew occurs in any one of the other reference images d101K, d101M and d101Y.

The controller 150 sequentially writes the timings at which the reference images d101K through d101Y of the reference patterns pP1 and pP2 are sensed and determines the time intervals t1*a* through t3*a* and t1*b* through t3*b*. The controller 150 then calculates a screw angle $\theta$ with the reference images at which the time lag $\Delta t$ has occurred. Subsequently, the controller 150 tilts the corresponding mirror via the associated mirror tilting means to thereby correct the skew.

Figure 17:
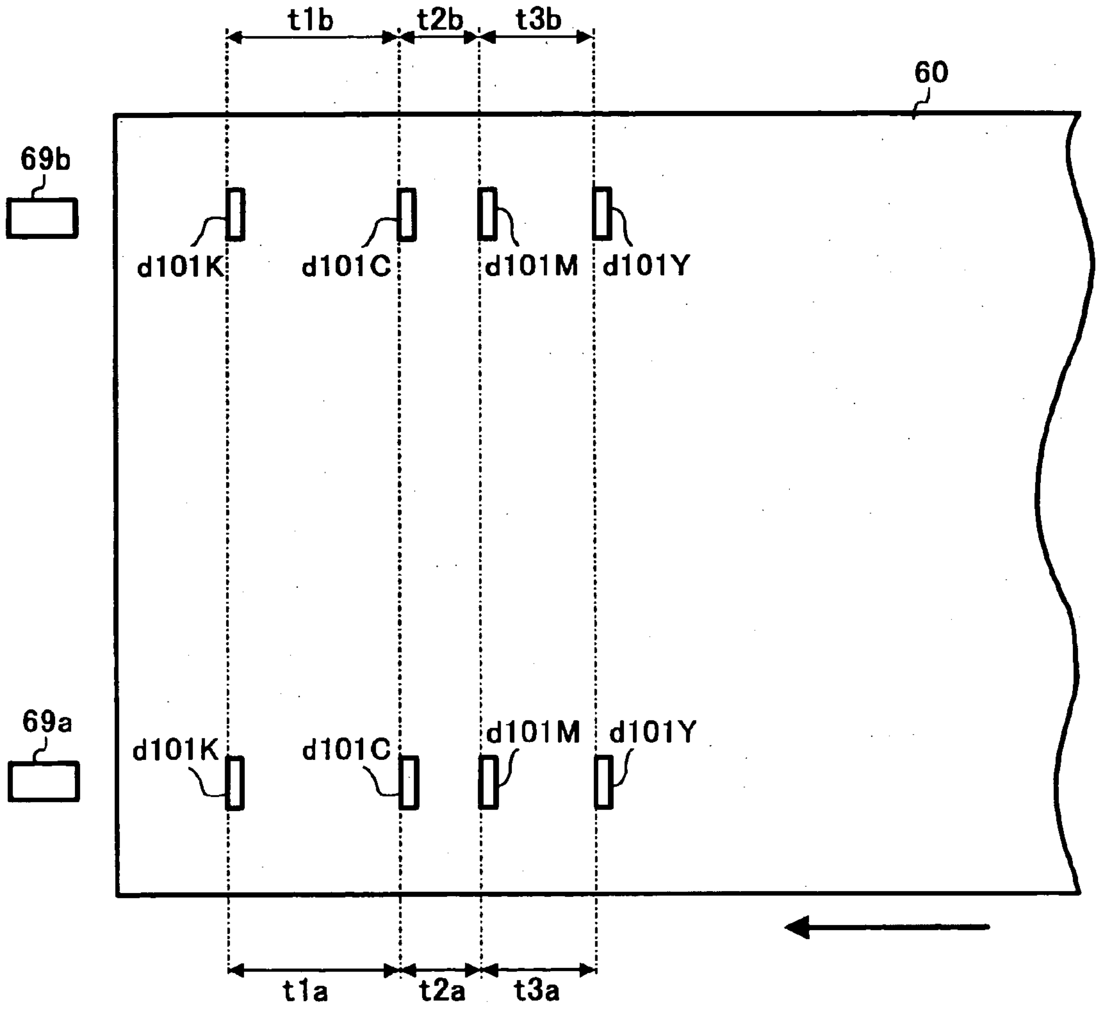
FIG. 17 shows the reference patterns in a condition in which a positional error has occurred due to registration in the subscanning direction.

Assume that the C light source, for example, included in the writing unit 2 is driven at an unexpected timing. Then, as shown in FIG. 17, the reference images d101C are dislocated due to registration in the subscanning direction. As a result, the time intervals t1*a* through t3*a* become different from each other, and so do the time intervals t1*b* through t3*b*. However, the time intervals t1*a* through t3*a* and time intervals t1*b* through t3*b* each differ from each other when a positional error ascribable to skew occurs as well, as shown in FIG. 16. In light of this, after correcting any one of the time intervals t1*a* through t3*a* and t1*b* through t3*b* on the basis of the time lag $\Delta t$, the controller 150 determines a positional error due to registration in the subscanning direction. The controller 150 then corrects K, C, M or Y drive timing for thereby correcting registration in the subscanning direction.

Figure 18:
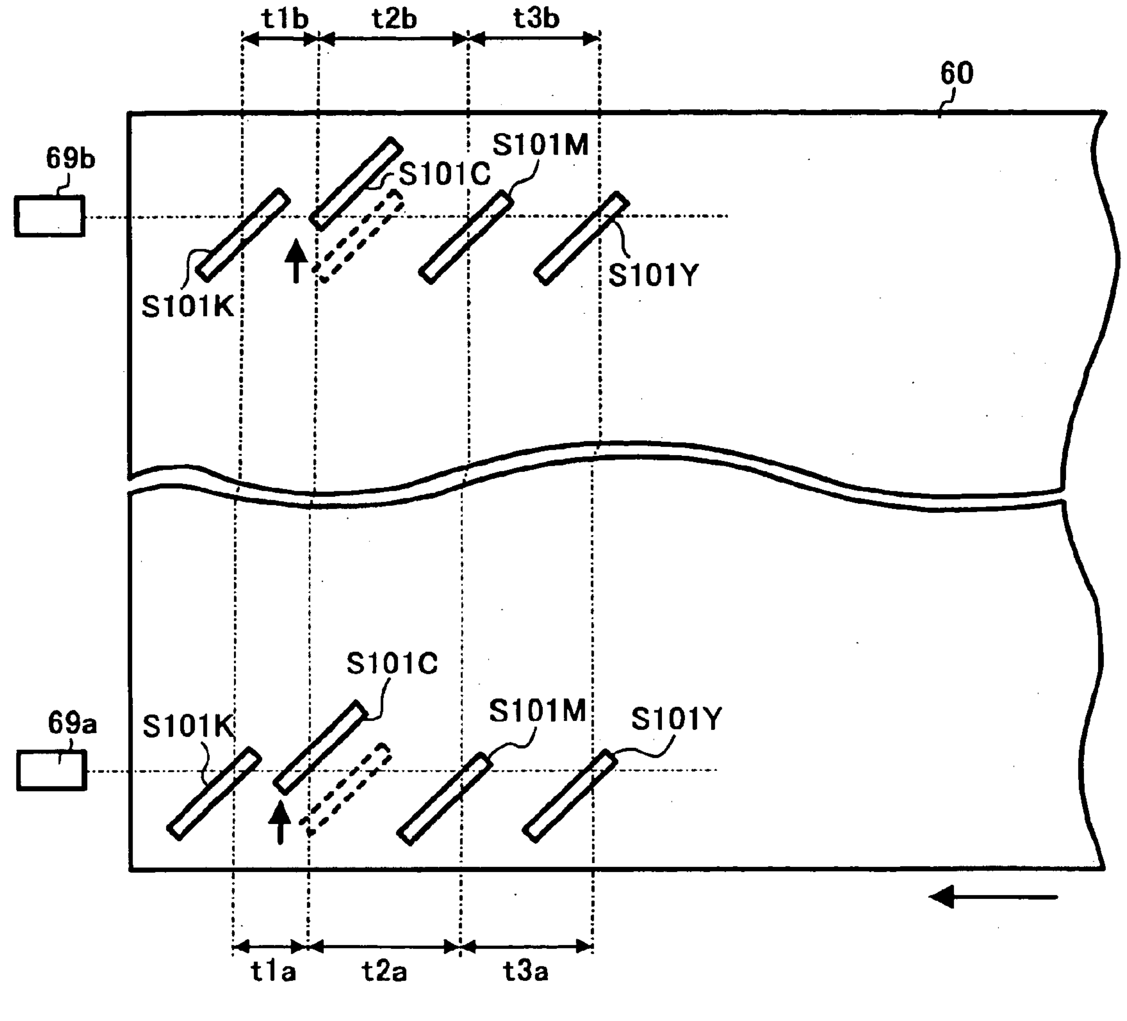
FIG. 18 shows the reference patterns in a condition in which a positional error has occurred due to registration in the main scanning direction.
Figure 19:
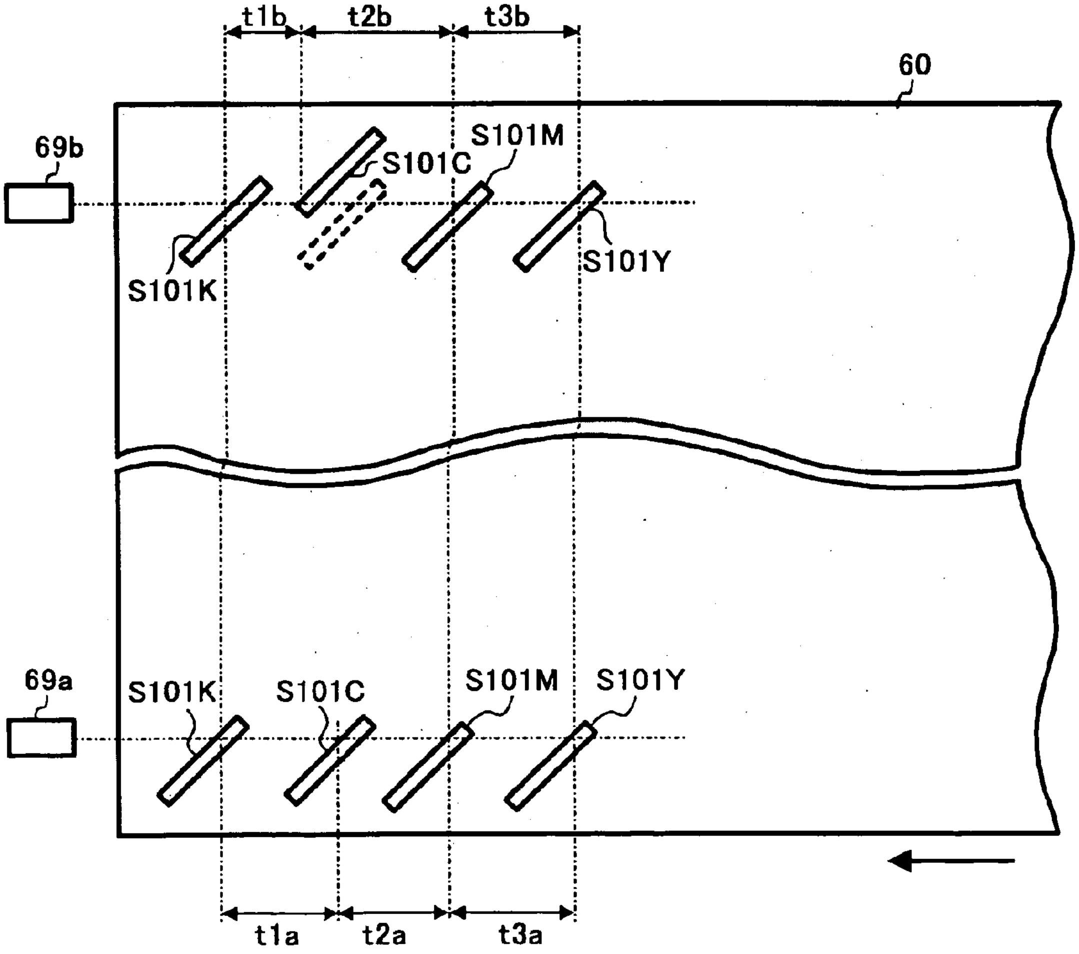
FIG. 19 shows the reference patterns in a condition in which a positional error due to registration in the main scanning direction and a change in magnification in the same direction have occurred.

After the above-described correction dealing with the skew and registration in the subscanning direction, the controller 150 corrects a positional error due to registration in the main scanning direction by using the reference images s101K through s101Y of the reference patterns pP1 and pP2. So long as a positional error due to registration in the main scanning direction is zero, the intervals t1*a* through t1*b* and t2*b* through t3*b* all are the same, as stated earlier. However, as shown in FIG. 18, assume that a positional error due to registration in the main scanning direction occurs in, e.g., the reference image s101C of the reference pattern pP2. Then, the time intervals t1*b* through t3*b* become different from each other. If the reference image 101C has an expected size in the main scanning direction, then the reference pattern s101C of the other reference pattern pP1 is also shifted. Consequently, the time intervals t1*a* through t3*b* also become different from each other in synchronism with the time intervals t1*b* through t3*b*.

On the other hand, assume that the reference image s101 in question has a size greater than the expected size in the main scanning direction. Then, the reference image s101C of the reference pattern Pp2, for example, is shifted, but the reference image s101C of the reference pattern pP1 is not shifted at all or is shifted little.

In the illustrative embodiment, by using the time intervals t1*a* through t3*a* and t1*b* through t3*b* and the moving speed of the belt 60, the controller 150 calculates the shifts of the reference images s101K through s101Y of the reference patterns pP1 and pP2 in the main scanning direction as well as magnifications thereof in the same direction. The controller 150 then corrects the drive timings of the polygonal mirrors and causes the mirror tilting means to tilt the associated mirrors, thereby correcting positional errors ascribable to registration and magnification errors.

As stated above, the controller 150 corrects skew and positional errors in the main and subscanning directions color by color and thereby frees a full-color toner image from misregister during printing.

It is to be noted that the controller 150 corrects magnification in the subscanning direction on the basis of a period of time over which the individual reference image d101 is sensed.

Hereinafter will be described arrangements unique to the illustrative embodiment. The slack S of the belt 60 described with reference to FIG. 1 as a problem with the conventional image forming apparatus distorts or dislocates an image. Further, in the case of a full-color image, the slack S is apt to bring color components out of register. This is particularly true with a tandem, color laser printer in which a toner image of particular color is positioned at each nip for image transfer. Moreover, reference images of different colors for correction are also dislocated and make adequate correction difficult. To solve this problem, it has been customary to drive the belt 60 for a period of time long enough for the slack S to disappear before starting forming reference images or the color components of a full-color image. This, however, makes it difficult to reduce the image forming time.

In the illustrative embodiment, the controller 150 is configured to start driving the drums 11Y through 11K before driving the belt 60 in the event of formation of the reference images of different colors or the execution of the printing process.

Figure 20:
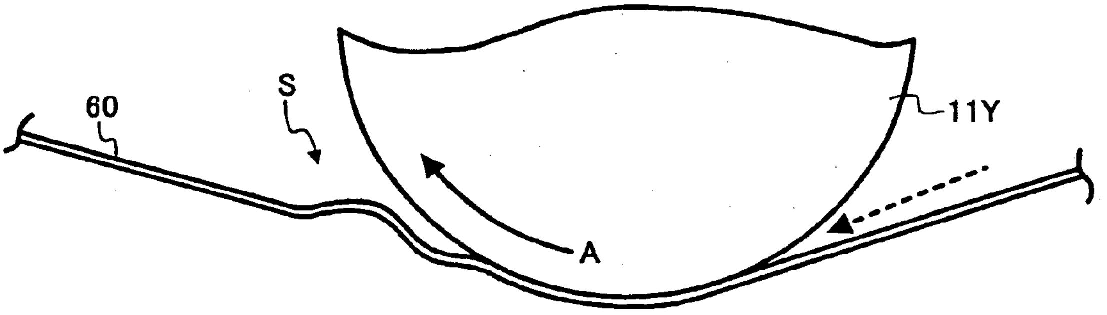
FIGS. 20 and 21 are views showing the nip in a condition just after the start of drive of the belt.

FIG. 20 shows a nip between, e.g., the drum 11Y and the belt 60 of the illustrative embodiment in a condition just after the start of drive of the drum 11Y. The following description applies to the nips between the other drums 11M, 11C and 11K and the belt 60 as well. When the drum 11Y starts rotating, the drum 11Y rubs the portion of the belt 60 contacting it and tends to entrain the belt 60. As a result, the portion of the belt 60 upstream of the nip between the belt 60 and the drum 11Y is stretched without slackening. However, the portion of the belt 60 forming the nip slightly moves toward the downstream side with the result that the belt 60 forms a slack S at a position downstream of the nip.

Figure 21:
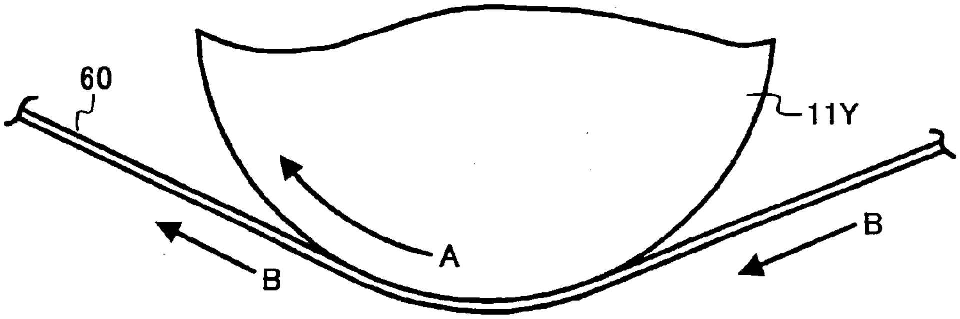

Assume that the drive roller (leftmost support roller 61 shown in FIG. 5) or driving means starts rotating in the condition shown in FIG. 20. Then, the slack S of the belt 60 is pulled in the direction of movement of the belt 60 and therefore absorbed. As a result, as shown in FIG. 21, the portion of the belt 60 downstream of the nip is stretched while the portion of the belt 60 upstream of the nip is continuously pulled via the downstream portion and nip portion of the belt 60. This frees the belt 60 from the temporary slack otherwise formed at the side upstream of the nip.

The drive control described above obviates the distortion and dislocation of an image ascribable to the slack of the belt 60 at the upstream side even if the interval between the start of drive of the belt 60 and the start of image transfer is reduced. This successfully reduces the overall image forming time. This is also true with the reference images of different colors.

Figure 22A:
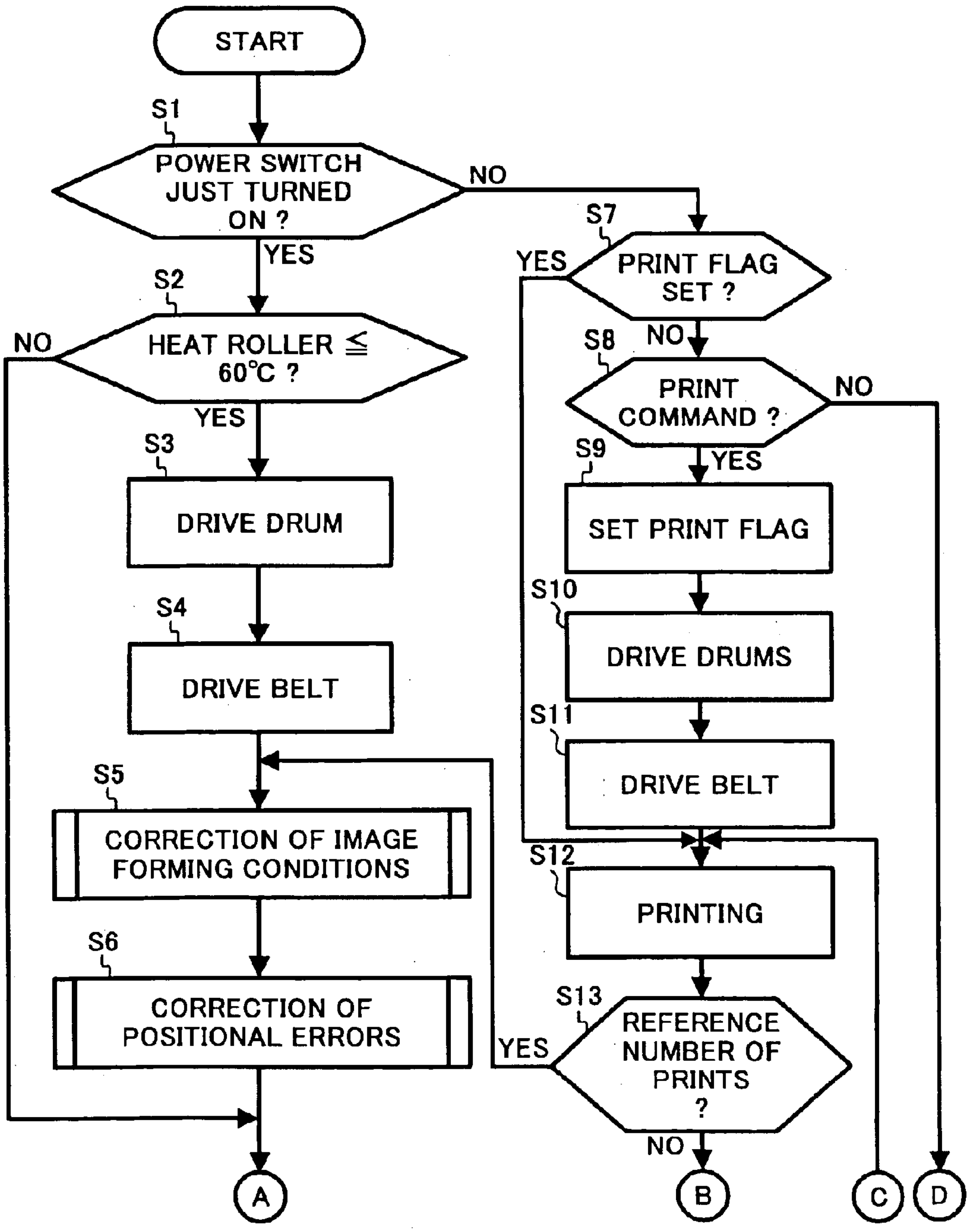
FIG. 22 is a flowchart demonstrating a specific control procedure available with the illustrative embodiment.
Figure 22B:
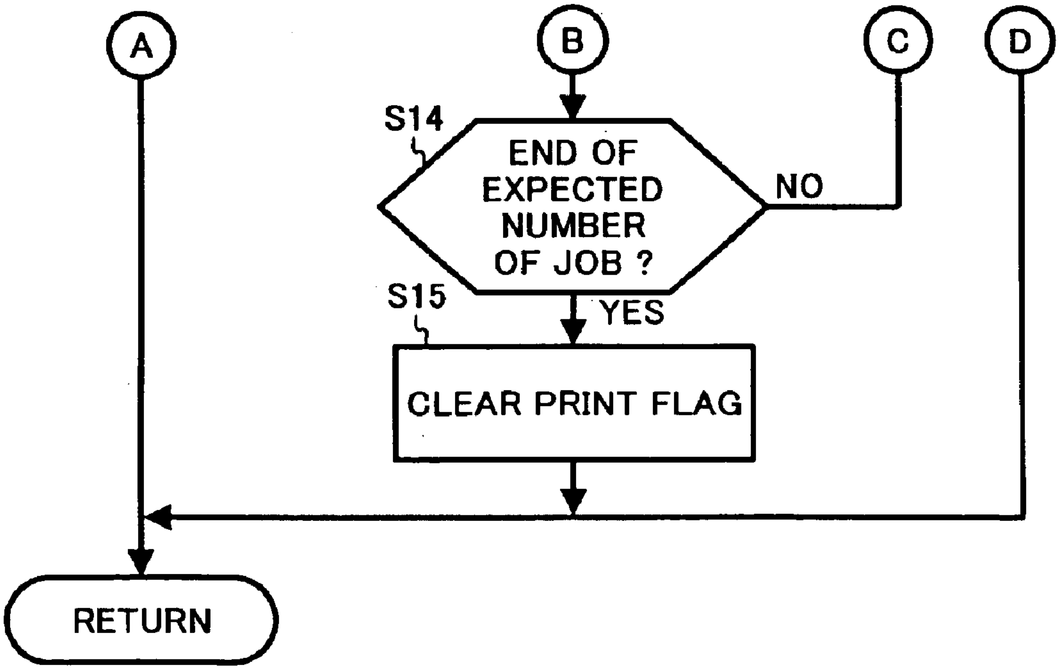

FIG. 22 demonstrates a specific control procedure executed by the controller 150. As shown, the controller 150 first determines whether or not the power switch has just been turned on (step S1). If the answer of the step S1 positive (YES), then the controller 150 determines whether or not the temperature of the heat roller included in the fixing unit 7 is 60° C. or below (step S2).

Assume that a relatively long period of time has elapsed since the turn-off of the power switch, so that the heat roller has not been fully warmed up yet. Then, the controller 150 determines that the heat roller temperature is 60° C. or below (YES, step S2). In this case, the controller 150 starts driving the drums 11Y through 11K (step S3) and then starts driving the belt 60 (step S4), thereby preventing the belt 60 from slackening at the side upstream of the nip. Subsequently, the controller 150 sequentially corrects image forming conditions and positional errors (steps S5 and S6), as stated earlier, and then returns. Such correction is therefore free from the distortion and dislocation of the reference images 101 of different colors ascribable to the slack of the belt 60.

Assume that the power switch is turned off and then turned on at a relatively short interval, so that the heat roller is not sufficiently cooled off. Then, the controller 150 determines that the heat roller temperature is above 60° C. (NO, step S2) and then returns.

If the answer of the step S1 is NO, meaning that the power switch has not just been turned on, then the controller 150 determines whether or not a print flag, which will be described later, is set (step S7). If the answer of the step S7 is NO, then the controller 150 determines whether or not a print command is input (step S8). If the answer of the step S8 is NO, then the controller 150 returns. If the answer of the step S8 is YES, then the controller 150 sets the print flag (step S9). Subsequently, the controller 150 starts driving the drums 11Y through 11K (step S10) and then starts driving the belt 60 (step S11), thereby preventing the portion of the belt 60 upstream of the nip from slackening. The controller 150 then executes a printing operation (step S12).

On completing one print job, the controller 150 determines whether or not a reference number of prints have been output after the correction of image forming conditions and positional errors executed last time (step S13). If the answer of the step S13 is NO, meaning that correction is not necessary, then the controller 150 is capable of executing the next printing operation. The controller 150 determines whether or not an expected number of jobs have ended (step S14). If the answer of the step S14 is NO, then the controller 150 returns to the step S12 to execute the next printing operation. If the answer of the step S14 is YES, then the controller 150 clears the print flag (step S15) and then returns.

On the other hand, if the answer of the step S13 is YES, meaning that correction must be executed before the next printing operation, then the controller 150 executes the step S5. At this instant, the belt 60 has already been driven in a slack-free state by the control of the steps S10 and S11. Also, the print flag has been set in the step S9. Therefore, after the steps S5 and S6, the controller 150 returns and sees that the print flag is set (YES, step S7). In this case, the step S7 is followed by the step S12.

The illustrative embodiment obviates positional errors and skew by correcting mirror angles and other conditions inside the optical writing unit 2 and therefore the positions of latent images on the drums 11Y through 11K, as stated above. Alternatively, the positions of latent images may be corrected by correcting the positions of the drums or similar image carriers or the position of the belt or similar endless movable body.

In summary, it will be seen that the present invention provides an image forming apparatus having various unprecedented advantages, as enumerated below.

(1) The apparatus reduces the image forming time and obviates the distortion, dislocation or similar disfigurement of an image ascribable to the slack of a belt at the side upstream of a nip. Color components expected to form a full-color image are also free from misregister ascribable to the slack.

(2) The apparatus forms a full-color image in a shorter period of time than an image forming apparatus of the type including a single image carrier.

(3) The apparatus obviates the misregister of color components ascribable to relative positional deviation between image carriers. Reference images used to correct the positional deviation are also free from distortion and dislocation ascribable to the slack.

Various modifications will become possible for those skilled in the art after receiving the teachings of the present disclosure without departing from the scope thereof.

What is claimed is:

1. An image forming apparatus, comprising:

an image carrier comprising a surface configured to move in a preselected direction while carrying a toner image thereon;

a movable body comprising a surface configured to contact the surface of the image carrier to form a nip and to move in a same direction as the surface of the image carrier;

driving means for driving the moveable body, the driving means disposed downstream of the nip in the preselected direction; and control means for controllably driving the image carrier and the movable body such that the movable body starts moving after the image carrier has started moving.

2. The apparatus according to claim 1, further comprising:

means for sequentially forming toner images of different colors on the image carrier and for sequentially transferring the toner images from the image carrier to the movable body one above the other to form a multiple color image.

3. The apparatus according to claim 2, further comprising:

a plurality of second image carriers configured to carry toner images of different colors, wherein the movable body is configured to move with and to contact the plurality of second image carriers.

4. The apparatus as claimed in claim 3, further comprising:

sensing means for sensing the toner images transferred to the movable body;

correcting means for correcting, based on an output of the sensing means, a relative positional deviation between the toner images formed on the image carriers; and means for forming reference toner image patterns on the image carriers and then transferring the patterns to the movable body.

5. The apparatus as claimed in claim 4, wherein the image carrier comprises a rotatable drum, the movable body comprises a belt, and the driving means comprises a drive roller.

6. An image forming method, comprising:

moving a surface of an image carrier, which carriers a toner image thereon, in a preselected direction;

moving a surface of a movable body in a same direction as the surface of the image carrier in contact with the surface of the image carrier to form a nip;

driving the movable body with driving means disposed downstream of the nip in the preselected direction; and controlling the image carrier and the movable body such that the movable body starts moving after the image carrier has started moving.

* * * * *